(12) United States Patent
O'Krafka et al.

(10) Patent No.: US 10,019,174 B2
(45) Date of Patent: Jul. 10, 2018

(54) READ OPERATION DELAY

(71) Applicant: SANDISK TECHNOLOGIES LLC, Dallas, TX (US)

(72) Inventors: Brian Walter O'Krafka, Austin, TX (US); Johann George, Sunnyvale, CA (US); Akshay Mathur, Los Gatos, CA (US)

(73) Assignee: SANDISK TECHNOLOGIES LLC, Addison, TX (US)

( * ) Notice: Subject to any disclaimer, the term of this patent is extended or adjusted under 35 U.S.C. 154(b) by 210 days.

(21) Appl. No.: 14/924,592

(22) Filed: Oct. 27, 2015

(65) Prior Publication Data

US 2017/0115891 A1 Apr. 27, 2017

(51) Int. Cl.
*G06F 12/02* (2006.01)
*G06F 3/06* (2006.01)

(52) U.S. Cl.
CPC .......... *G06F 3/0611* (2013.01); *G06F 3/0604* (2013.01); *G06F 3/0629* (2013.01); *G06F 3/0659* (2013.01); *G06F 3/0688* (2013.01)

(58) Field of Classification Search
CPC .... G06F 3/0611; G06F 3/0604; G06F 3/0629; G06F 3/0688; G06F 3/0644; G06F 3/0659
See application file for complete search history.

(56) References Cited

U.S. PATENT DOCUMENTS

| 5,446,849 | A | * | 8/1995 | Minagawa .......... G06F 9/30072 711/E12.064 |
| 8,417,871 | B1 | | 4/2013 | De La Iglesia |
| 8,621,142 | B1 | | 12/2013 | Miller et al. |
| 8,868,954 | B1 | * | 10/2014 | Balakrsihnan ........ G06F 3/0611 711/114 |
| 8,909,860 | B2 | | 12/2014 | Rao |
| 8,972,689 | B1 | | 3/2015 | De La Iglesia |
| 9,529,670 | B2 | * | 12/2016 | O'Connor ........... G06F 11/1076 |
| 2011/0258362 | A1 | | 10/2011 | McLaren et al. |
| 2012/0005399 | A1 | * | 1/2012 | Nakayama ............ G06F 13/385 710/316 |
| 2014/0013187 | A1 | | 1/2014 | Blaunstein |
| 2014/0325148 | A1 | | 10/2014 | Choi et al. |
| 2015/0006830 | A1 | | 1/2015 | Shin et al. |
| 2015/0019918 | A1 | | 1/2015 | Li |
| 2017/0004063 | A1 | * | 1/2017 | Broderick ........... G06F 11/3495 |

OTHER PUBLICATIONS

"Running Federal IT at the Speed of Memory: Violin Memory Technology for Federal Government Agencies", White Paper, Violin Memory, www.vmem.com, Jan. 2013, pp. 1-12.
International Search Report and Written Opinion of the International Searching Authority dated Dec. 6, 2016 in International Application No. PCT/US2016/051838, 13 pages.

* cited by examiner

*Primary Examiner* — Hiep Nguyen
(74) *Attorney, Agent, or Firm* — Vierra Magen Marcus LLP

(57) ABSTRACT

A storage device may be configured to determine a delay associated with execution of a read operation responsive to a read command for data stored at the storage device. The storage device may send a notification that indicates the delay, that includes data that indicates a duration of the delay, or both. In response to receiving the notification, an access device may be configured to generate a second read command for redundant associated with data stored at the storage device.

32 Claims, 7 Drawing Sheets

READ OPERATION DELAY

FIELD OF THE DISCLOSURE

This disclosure is generally related to memory access operations.

BACKGROUND

A storage device may be coupled to another device, such as an access device, that is configured to send read and write commands to the storage device. After the storage device receives a read command from the access device, the storage device may schedule and execute the read command. The read command has a read latency (i.e., an amount of time between when the read command is received and when the read command has completed execution). The read latency is increased when a pending memory operation, such as an erase operation, delays the start of executing the read command. An increase in the read latency affects performance of the access device that requested the data. For example, if the read command is not executed within a timeout period, the read command (for data) may be canceled by the storage device and the access device may have to resend the read command to the storage device or may have to request redundant data from the storage device to recover the data.

DETAILED DESCRIPTION

Figure 1:
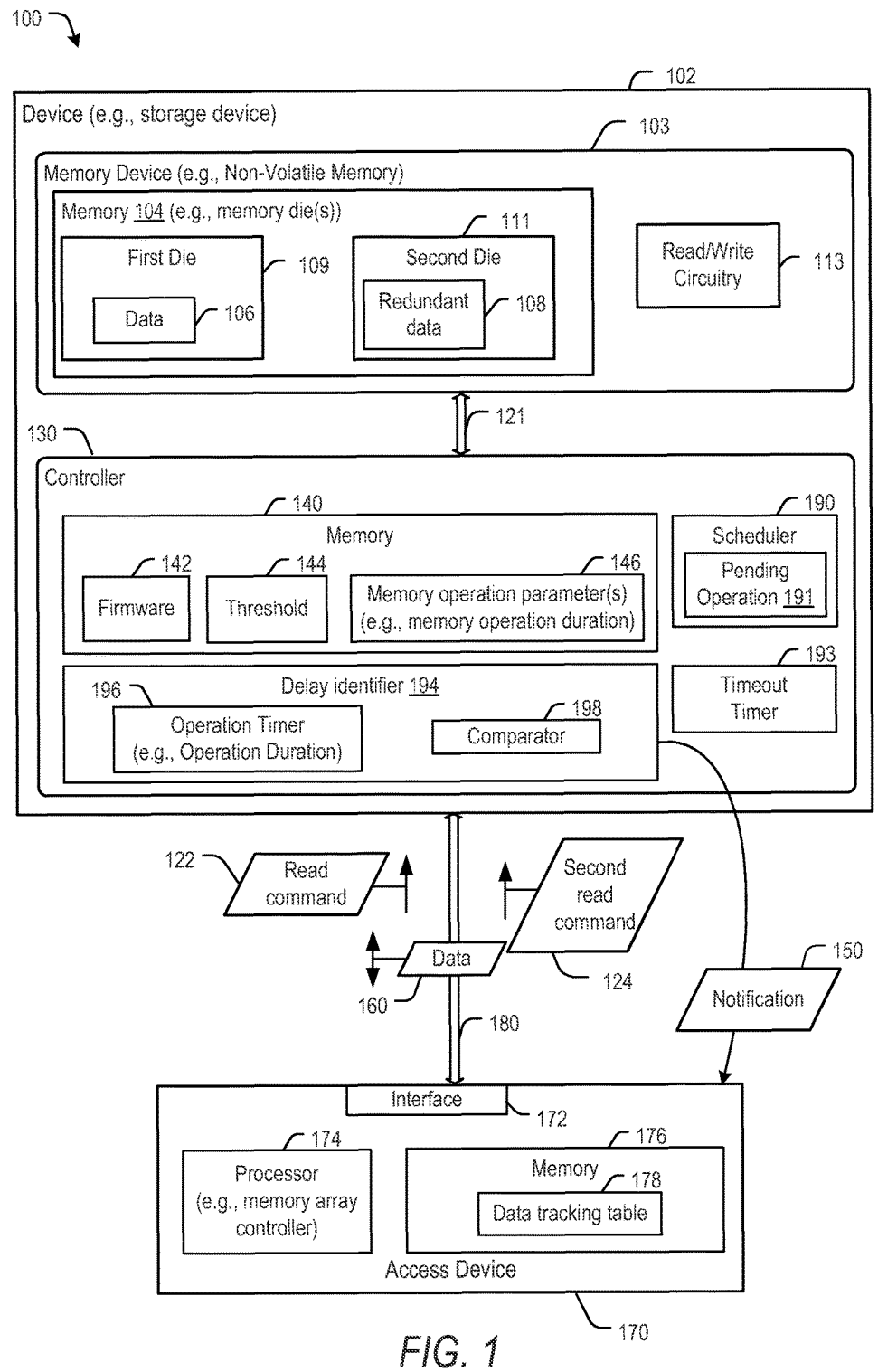
FIG. 1 is a block diagram of a particular illustrative example of a system including a data storage device operable to generate a notification indicating a delay associated with a read operation.

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "examplary" may indicate an example, an implementation, and/or an aspect, and should not be construed as limiting or as indicating a preference or a preferred example, implementation, and/or aspect.

The present disclosure describes systems and methods to read data stored at a storage device. For example, an access device may send a read command to the storage device to read data stored at the storage device. In some implementations, the storage device may include a solid-state drive (SSD). Responsive to the read command, the storage device may identify a pending memory operation at the storage device. Execution of the pending operation may delay a start of execution of a read operation responsive to the read command. To illustrate, execution of the pending operation may render the data to be read (based on a read command) temporarily inaccessible. For example, the pending operation (e.g., a write operation, an erase operation, a data recovery operation, a data move operation, a data refresh operation, or a background operation, etc.) may perform a refresh operation on the data, thus temporarily prohibiting the data from being read in response to the read command. In some implementations, the pending operation may include multiple operations, such as a read operation, a write operation, and an erase operation, as an illustrative, non-limiting example. Execution of the read operation may be delayed at least until the pending operation is completed, such as while the pending operation is being executed.

The storage device may send a notification to the access device prior to completion of the pending operation. In some implementations, the notification may indicate that a delay related to execution of the read operation is greater than or equal to a threshold amount of time. Additionally or alternatively, the notification may indicate a delay duration, such as a delay value, related to a time of starting execution of the read operation. For example, the notification may include delay data that indicates the delay duration. The threshold amount of time may be predetermined (e.g., pre-programmed) or may be dynamically determined. For example, the threshold amount of time may be dynamically determined by the access device and provided to the storage device. To illustrate, during operation of the access device, the access device may determine the threshold amount of time to maintain or increase performance of the access device. As another example, the access device may determine the threshold amount of time as an average delay duration of multiple commands.

In response to receiving the notification, the access device may identify a particular storage device (e.g., the same storage device or a different storage device) that includes at least a portion of redundant data associated with the data. For example, the access device may include a data tracking table that indicates a first storage location of the data (at the storage device) and that indicates a second storage location of the redundant data (at the storage device or at another storage device). The redundant data may include a copy of the data, parity data that enables the data to be reconstructed, or a combination thereof. The access device may send a second read command requesting the redundant data. In response to the second read command, the access device may receive a representation of at least a portion of the redundant data.

In some implementations, the access device may be coupled to multiple data storage devices (e.g., multiple SSDs). The multiple data storage devices may have a redundant array of independent disks (RAID) configuration, such as a RAID 1 configuration, a RAID 5 configuration, a RAID 6 configuration, a RAID 10 configuration, a RAID 15 configuration, a RAID 16 configuration, a RAID 51 configuration, or another RAID configuration. In some implementations, the RAID configuration may be configured to tolerate two or more failures and/or data being unavailable from two or more locations (e.g., two or more storage devices). The access device may send a read command to a first SSD of the multiple SSDs to request data. In response to receiving a notification indicating that the data is temporarily unavailable (e.g., due to a pending operation that causes a delay associated with execution of the read operation) at the first SSD, the access device may identify a second SSD that includes at least a portion of redundant data corresponding to the data.

By sending a notification from the storage device to the access device, the storage device notifies the access device that execution of the read command to read data is delayed. In response to the notification, the access device may request and receive redundant data corresponding to the data (e.g., from a different data storage device) and may obtain the data based on the redundant data. For example, the redundant data may include at least a portion of a copy of the data, at least a portion of parity data that may be used to generate the data, or both. Obtaining the data based on the redundant data may occur faster than receiving the data responsive to the read command (which the notification indicates is delayed). Accordingly, in response to the notification, the access device may perform a remedial action (e.g., requesting redundant data) to reduce a delay in receiving the data responsive to the read command sent to the storage device.

FIG. 1 depicts an illustrative example of a system 100. The system 100 includes a storage device 102 and an access device 170. The storage device 102 includes a controller 130 and a memory device 103 that is coupled to the controller 130.

The system 100 may be configured to send a notification 150 indicating a delay related to execution of a read operation from the storage device 102 to the access device. To illustrate, the access device 170 may send a read command 122 to the storage device 102 requesting data 106 stored at the storage device 102. The storage device 102 may send the notification 150 to the access device 170 if a pending operation 191 of the storage device 102 causes a delay (or an expected delay) related to execution of a read operation responsive to the read command 122. For example, the notification 150 may indicate that there is a delay, may indicate a duration of the delay, or both.

In response to the notification 150, the access device 170 may be configured to identify a storage location of redundant data 108 that corresponds to the data 106. The redundant data 108 may include a copy of the data 106, a partial copy of the data 106, a compressed version of the data 106, an encoded version of the data 106, parity data corresponding to the data 106, or another form of redundant data that enables recovery of the data 106 (e.g., in the event that the data 106 is lost or corrupted). The access device 170 may send (to the storage device 102 or to another storage device) a second read command 124 to request the redundant data 108. The access device 170 may receive a representation of the redundant data 108 and may obtain (e.g., recover) the data 106 based on the representation of the redundant data 108. In some implementations, the access device 170 may receive the representation of the redundant data 108 prior to completion of the pending operation 191 by the storage device 102. Accordingly, communicating the notification 150 from the storage device 102 to the access device 170 may enable the access device 170 to identify a delay associated with the read command 122. In response to the notification 150, the access device 170 may determine to request the redundant data 108 in order to obtain the data 106 more quickly than waiting to receive the data 106 responsive to the read command 122. Additionally or alternatively, the access device 170 may receive the notification 150 prior to expiration of a timeout period corresponding to the read command 122. Accordingly, the access device 170 may send the second read command 124 at an earlier time (as compared to the access device 170 waiting for an indication of the timeout period before sending the second read command 124). Thus, the notification 150 may enable the access device 170 to receive the redundant data 108 (and obtain the data 106) in situations when the pending operation causes a delay related to a time of starting execution of the read operation. Additional aspects of the system 100 are described further herein.

The storage device 102 and the access device 170 may be coupled via a connection (e.g., a communication path 180), such as a bus, a network, or a wireless connection. The storage device 102 may include an interface (e.g., an access device interface) that enables communication via the communication path 180 between the storage device 102 and the access device 170.

The access device 170 may include an interface 172 and may be configured to communicate with the storage device 102 via the interface 172 to read data from and write data to the memory device 103 of the storage device 102. For example, the access device 170 may operate in compliance with a Joint Electron Devices Engineering Council (JEDEC) industry specification, such as a Universal Flash Storage (UFS) Access Controller Interface specification. As other examples, the access device 170 may operate in compliance with one or more other specifications, such as a Secure Digital (SD) Access Controller specification, as an illustrative, non-limiting example. The access device 170 may communicate with the memory device 103 in accordance with any other suitable communication protocol. In some implementations, the interface 172 may be configured to be coupled to multiple storage devices (e.g., multiple data storage devices), as described with reference to FIGS. 2-3.

The access device 170 may include a processor 174 (e.g., a memory array controller) and a memory 176. The processor 174 may be coupled to the interface 172 and to the memory 176. The memory 176 may be configured to store data, such as a data tracking table 178, and/or instructions that may be executable by the processor 174. The data tracking table 178 may track data stored at one or more storage devices, such as the storage device 102. In some implementations, the data tracked by the data tracking table 178 may include redundant data, such as the redundant data 108 as described further herein. The memory 176 may be a single memory or may include multiple memories, such as one or more non-volatile memories, one or more volatile memories, or a combination thereof.

The access device 170 may issue one or more commands to the storage device 102, such as one or more requests to erase data, read data from, or write data to the memory device 103 of the storage device 102. For example, the access device 170 may be configured to provide data, such as data 160, to be stored at the memory device 103 or to request data to be read from the memory device 103. To illustrate, the access device 170 may be configured to send a read command 122 that includes a request for data 106 (stored at the memory device 103) to the storage device 102.

The memory device 103 of the storage device 102 may include one or more memory dies. The memory device 103 includes a memory 104, such as a non-volatile memory of storage elements included in a memory die of the memory device 103. For example, the memory 104 may include a flash memory, such as a NAND flash memory, as illustrative, non-limiting examples. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory device 103 may include support circuitry, such as read/write circuitry 113, to support operation of one or more memory dies of the memory device 103. Although depicted as a single component, the read/write circuitry 113 may be divided into separate components of the memory device 103, such as read circuitry and write circuitry. The read/write circuitry 113 may be external to the one or more dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies.

The memory 104 may include one or more dies, such as a first die 109 and a second die 111. In some implementations, when the memory 104 includes multiple dies, the multiple dies may have a RAID configuration, such as a RAID 1 configuration, a RAID 5 configuration, a RAID 6 configuration, a RAID 10 configuration, a RAID 15 configuration, a RAID 16 configuration, a RAID 51 configuration, or another RAID configuration. Each of the one or more dies may include one or more blocks, such as a NAND flash erase group of storage elements. Each of the blocks may include one or more groups of storage elements (also referred to herein as memory cells). Each group of storage elements may include multiple storage elements (e.g., memory cells) and may be configured as a word line. A word line may function as a single-level-cell (SLC) word line, as a multi-level-cell (MLC) word line, or as a tri-level-cell (TLC) word line, as illustrative, non-limiting examples. Each storage element of the memory 104 may be programmable to a state (e.g., a threshold voltage in a flash configuration or a resistive state in a resistive memory configuration) that indicates one or more values.

The memory 104 may include the data 106 and the redundant data 108. For example, the data 106 may be stored at the first die 109 and the redundant data 108 may be stored at the second die 111. The redundant data 108 may be associated with the data 106. For example, the redundant data 108 may include a copy of the data 106. As another example, the redundant data 108 may include parity data of the data 106. If the redundant data 108 includes the parity data, the parity data may be used to recover (e.g., reconstruct) the data 106.

The data 106 and the redundant data 108 may be stored such that the redundant data 108 is accessible while a pending operation (e.g., the pending operation 191) is being executed. Additionally, if the data 106 is stored at a first storage location, the redundant data 108 may be stored at a second storage location to provide redundancy in the event that the data 106 is erased or otherwise damaged (e.g., corrupted). For example, the data 106 may be erased or otherwise damaged as a result of a hardware failure, a program disturb condition, a read disturb condition, etc. In some implementations, the data 106 and the redundant data 108 may be stored at different blocks of the same memory die. As described with reference to FIGS. 2-3, the data 106 and the redundant data 108 may be stored in different dies and/or in different memory devices. For example, the data 106 may be stored at the first die 109 of the memory 104 and the redundant data 108 may be stored at the second die 111 of the memory 104. As another example, the data 106 may be stored in the memory device 103 of the storage device 102 and the redundant data 108 may be stored in a second memory device of a second storage device (not shown) that may be accessible to the access device 170. In a particular implementation, the data 106 may be accessed by a first operation in parallel (e.g., concurrently) with the redundant data 108 being accessed by a second operation.

In some implementations, the first die 109 and the second die 111 may be configured to be accessed concurrently by multiple access operations. For example, a first memory operation may be configured to access the first die 109 and a second memory operation may be configured to concurrently access the second die 111. Additionally or alternatively, the first die 109 or the second die 111 may be configured to be accessed concurrently by multiple access operations. For example, the second die 111 may be multi-ported. To illustrate, a third memory operation may be configured to access a first portion (e.g., a first storage element, a first word line, a first block, etc.) of the second die 111 via a first port and a fourth memory operation may be configured to concurrently access a second portion (e.g., a second storage element, a second word line, a second block, etc.) of the second die 111 via a second port.

The controller 130 is coupled to the memory device 103 via a bus 121, an interface (e.g., interface circuitry of the controller 130), another structure, or a combination thereof. For example, the bus 121 may include one or more channels to enable the controller 130 to communicate with a single memory die of the memory device. As another example, the bus 121 may include multiple distinct channels to enable the controller 130 to communicate with multiple memory dies of the memory device 103 in parallel with, and independently of, communication with other memory dies of the memory device 103.

The controller 130 is configured to receive data and instructions from the access device 170 and to send data to the access device 170. For example, the controller 130 may send data to the access device 170 via the communication path 180, and the controller 130 may receive data from the access device 170 via the communication path 180. The controller 130 is configured to send data and commands to the memory 104 and to receive data from the memory 104. For example, the controller 130 is configured to send data and a write command to cause the memory 104 to store data to a specified address of the memory 104. The write command may specify a physical address of a portion of the memory 104 (e.g., a physical address of a word line of the memory 104) that is to store the data. The controller 130 may also be configured to send data and commands to the memory 104 associated with background operations, such as scanning operations, garbage collection operations, and/or wear leveling operations, etc., as illustrative, non-limiting examples. The controller 130 is configured to send a read command to the memory 104 to access data from a specified address of the memory 104. The read command may specify the physical address of a portion of the memory 104 (e.g., a physical address of a word line of the memory 104).

The controller 130 includes a second memory 140, a scheduler 190, a timeout timer 193, and a delay identifier 194. The scheduler 190 may be configured to schedule one or more commands (e.g., one or more memory operations) to be performed at the memory 104. For example, the scheduler 190 may be configured to schedule a pending operation 191 to be executed at the memory device 103. As another example, the scheduler 190 may be configured to schedule execution of the read command 122. In some implementations, the pending operation 191 may be scheduled prior to the read command 122 being received by the storage device 102.

The second memory 140 may include a volatile memory, a non-volatile memory, or a combination of volatile and non-volatile memory. For example, the second memory 140 may include a read only memory (ROM), a random access memory (RAM), or a combination thereof. The second memory 140 may include firmware 142, a threshold 144, and one or more memory operation parameters 146. When the second memory 140 is a volatile memory, the firmware 142, the threshold 144, and the one or more memory operation parameters 146 may be stored in a non-volatile memory, such as the memory 104, and loaded into the second memory 140.

The threshold 144 may correspond to a threshold amount of time that a read operation may be delayed. The threshold 144 may be a predetermined (e.g., pre-programmed) value. For example, the threshold 144 may have a value that is less than a duration of a timeout period of a read command (e.g., a read operation), such as the read command 122. Alternatively, the threshold 144 may be dynamically determined. For example, the threshold amount of time may be determined as an average delay duration of multiple commands received by the storage device 102. In some implementations, the threshold 144 (e.g., a pre-programmed value or a dynamically determined value) may be provided to the storage device 102 from the access device 170. To illustrate, during operation of the access device 170, the access device 170 may determine a value of the threshold 144 to maintain or increase performance of the access device 170 (e.g., to reduce an average delay duration to receive requested data).

The firmware 142 may include a set of one or more instructions that is executable by a processor (not shown) to perform one or more of the operations as described herein. In association with executing the firmware 142, the processor may access the threshold 144 and/or the one or more memory operation parameters 146.

The one or more memory operation parameters 146 may include information associated with one or more memory operations. For example, for each memory operation of the one or more memory operations, the one or more memory operation parameters 146 may include an execution duration of the memory operation. To illustrate, the one or more memory operation parameters 146 may include first execution duration of an erase operation and a second execution duration of a write operation, as an illustrative, non-limiting example. The execution duration may be a maximum execution duration, a minimum execution duration, an average execution duration (of previously executed memory operations having the same type, such as an erase type), or a most recent execution duration. In some implementations, the one or more memory operation parameters 146 (e.g., the execution duration) may be determined during operation of the storage device 102. In other operations, the one or more memory operation parameters 146 (e.g., the execution duration) may be determined during testing of the memory device 103 or the memory 104.

The delay identifier 194 may be configured to determine a delay value (e.g., a delay duration) that the pending operation 191 may delay execution of a read operation responsive to the read command 122. The delay value may correspond to a latency value associated with a time of executing a command, such as a read latency value of the read command 122 received from the access device 170 (e.g., the processor 174). The delay value may be related to an amount of time between a time of receiving the command and a time of starting (or a time of completing) execution of an operation responsive to the command. For example, the delay value may be determined based on an amount of time (e.g., an estimated amount of time) before execution of the pending operation 191 is completed (and the operation can be executed). To illustrate, if the pending operation 191 that delays the read operation is being executed, the delay value may be determined as a remaining time of execution of the pending operation 191, as described herein. Alternatively, if the pending operation 191 that delays the read operation is scheduled (and is not being executed), the delay value may be determined to be the execution duration (included in the one or more memory operation parameters 146) of the pending operation 191. In some implementations, the delay value may be determined as a sum of a remaining amount of time to complete execution of a first pending operation that is being executed and an execution duration (included in the one or more memory operation parameters 146) of a second pending operation that is scheduled to be executed.

The controller 130 (e.g., the delay identifier 194) may be configured to generate and to send the notification 150 to access device 170 (e.g., the processor 174) based on the delay value. For example, the controller 130 may be configured to compare a delay value associated with the read command 122 to the threshold 144 and to send the notification 150 indicating that a delay related to execution of the read operation is greater than or equal to the threshold 144. In this implementation, the controller 130 (e.g., the delay identifier 194) may send the notification 150 to the access device 170 (e.g., the processor 174) to indicate that execution of the command is predicted to be delayed by at least a delay period corresponding to the threshold 144. As another example, the controller 130 may send the notification 150 that includes the delay value in response to receiving the read command 122.

In some implementations, the notification 150 may include a single bit value, a multi-bit value, a message, or a data signal, such as an analog signal, as illustrative, non-limiting examples. The notification 150 may include first data that indicates execution of the read operation is delayed, second data that indicates a duration of the delay, third data that indicates whether the read operation is scheduled, or a combination thereof.

The delay identifier 194 may include an operation timer 196 and a comparator 198. The operation timer 196 may be configured to track an operation duration of an ongoing memory operation (e.g., a memory operation that is being executed). For example, the ongoing memory operation may include the pending operation 191 that has been initiated by the controller 130 after being scheduled. To illustrate, the pending operation 191 may be a write operation to write the data 106 to an erase block of the memory 104 as part of a garbage collection operation. If the read command 122 to read the data 106 is received during execution of the pending operation 191, the read command 122 may not be executed until after execution of the pending operation 191 is complete. In some implementations, if the storage device 102 is configured to execute multiple memory operations in parallel, such as a first memory operation at the first die 109 and a second memory operation at the second die 111, the delay identifier 194 may include multiple timers. To illustrate, the delay identifier 194 may include a first timer associated with the first die 109 of the memory 104 and a second timer associated with the second die 111 of the memory 104.

For each memory operation executed by the storage device 102, the delay identifier 194 may set the operation timer 196 to an initial value and initiate operation of the operation timer 196 to track a memory operation duration corresponding to the memory operation. For example, the delay identifier 194 may set a value of the operation timer 196 to an initial value (e.g., an execution duration of the one or more memory operation parameters 146) and may initiate the operation timer 196 to count down (e.g., decrement) from the initial value. To illustrate, storage device 102 may include a system clock and the operation timer 196 may decrement the value of the operation timer 196 by one for each clock cycle of the system clock. The value of the operation timer 196 may be associated with the amount of time before execution of the corresponding memory operation is complete.

In response to a determination that an ongoing memory operation (e.g., the pending operation 191 that is being executed) interferes with (e.g., delays) execution of a received command, the comparator 198 may be configured to compare the value of the operation timer 196 to the threshold 144. For example, the comparator 198 may compare the value of the operation timer 196 to the threshold 144 in response to the command (e.g., the read command 122) being received from the access device 170. The comparator 198 may determine whether the value of the operation timer 196 satisfies the threshold 144. For example, if the initial value of the operation timer 196 is set to the execution duration, the value of the operation timer 196 may satisfy the threshold 144 if the value is greater than or equal to the threshold 144. If the value of the operation timer 196 satisfies the threshold 144, the delay identifier 194 may determine the delay value associated with the read operation (corresponding to the read command 122) based on the value of the operation timer 196. For example, the value of the operation timer 196 may be determined to be the delay value (e.g., the read latency of the read command 122). In response to the value of the operation timer 196 satisfying the threshold 144, the delay identifier 194 may generate the notification 150.

The delay identifier 194 may take the form of a packaged functional hardware unit designed for use with other components, a portion of a program code (e.g., software or part of the firmware 142) executable by a (micro)processor or processing circuitry, or a self-contained hardware or software component that interfaces with a larger system, as illustrative, non-limiting examples.

The timeout timer 193 may be configured to indicate a timeout associated with an operation to be executed at the memory device 103. For each command received at the storage device 102 from the access device 170, a corresponding operation is to be executed (e.g., completed) within a timeout period. The timeout period for particular command may begin at a time when the particular command is received. For example, in response to receiving the particular command, the timeout timer 193 may initialized to a timeout value. If the operation is not completed within the timeout period (as tracked by the timeout timer 193), a timeout occurs. In response to the timeout, the controller 130 may be configured to cancel the operation and to send a timeout indication to the access device 170. The timeout indication may enable the access device to perform a remedial action, such as resending the particular command to the storage device 102 or sending a different command to the storage device 102 or another storage device. For example, if the particular command is the read command 122 that requests the data 106, the access device 170 may send the second read command 124 requesting the redundant data 108 to the storage device 102 or to another storage device (not shown) that includes the redundant data 108.

During operation, of the system 100, the access device 170 (e.g., the processor 174) may be configured to generate the read command 122 corresponding to the data 106 stored at the memory 104 (e.g., a non-volatile memory). For example, the read command 122 may include a request for the data 106. The access device 170 may send the read command 122 to the storage device 102.

In response to receiving the read command 122, the controller 130 may determine a delay value, such as an estimated amount of time before execution of a read operation that is responsive to the read command 122. To determine the delay value, the controller 130 may identify the pending operation 191 of the memory device 103. The pending operation 191 may be a scheduled operation or an operation being executed. Execution of the pending operation 191 may delay execution of the read operation.

After the delay value is determined, the controller 130 may compare the delay value to the threshold 144. In response to the delay value being greater than or equal to the threshold 144, the controller 130 may send the notification to the access device 170.

The access device 170 may receive the notification 150 from the storage device 102 responsive to the read command 122. Rather than wait for the data 106 to be received from the storage device 102 responsive to the read command 122, the access device 170 may determine to request the redundant data 108 associated with the data 106. To illustrate, responsive to the notification 150, the access device 170 may generate the second read command 124 to request the redundant data 108 (which corresponds to the data 106). The access device 170 may send the second read command 124 to the storage device 102. For example, the access device 170 (e.g., the processor 174) may send the second read command 124 prior to expiration of a timeout period corresponding to the read command 122. In some implementations, after sending the second read command 124, the access device 170 may receive an indication of expiration of the timeout period corresponding to the read command 122 from the storage device 102.

The storage device 102 may receive the second read command 124 and may schedule a second read operation responsive to the second read command 124. The second read command 124 may be executed to cause the redundant data 108 to be read from the memory 104 and to be provided to the controller 130. The second read command 124 may be executed while the pending operation 191 (or the read operation corresponding to the read command 122) is being executed. For example, the pending operation 191 (or the read operation corresponding to the read command 122) may be performed at a first storage location that stores the data 106 and a second read operation (corresponding to the second read command 124) may be performed at a second storage location that stores the redundant data 108. The controller 130 may send a representation of the redundant data 108 to the access device 170 via the communication path 180.

The access device 170 (e.g., the processor 174) may receive the redundant data 108 via the interface 172. The access device 170 may obtain the data 106 based on the redundant data 108. For example, in some implementations, the redundant data 108 may be a copy of the data 106 and the access device 170 may identify the redundant data 108 as the data 106. In other implementations, the redundant data 108 may include at least a portion of parity data corresponding to data 106. The access device 170 may generate the data 106 by implementing one or more data recovery (e.g., data reconstruction) techniques using the redundant data 108 (e.g., at least the portion of parity data).

In some implementations, the access device 170 may be configured to store the data tracking table 178 to track the data 106 and the redundant data 108. For example, the data tracking table 178 may indicate a first storage location of the data 106 and a second storage location of the redundant data 108. In some implementations, the first storage location may correspond to a first memory address, such as a first logical address, and the second storage location may correspond to a second memory address, such as a second logical address. The first storage location and the second storage location may be associated with the same storage device, such as the storage device 102. Alternatively, the first storage location and the second storage location may be associated with different storage devices. For example, the first storage location may correspond to the storage device 102 and the second storage location may correspond to a second storage device (not shown).

In some implementations, the read command 122 (or the second read command 124) may include function data that indicates functions (e.g., operations) to be performed by the storage device 102 to process the read command 122. For example, the function data may indicate to determine a delay value associated with the read command 122, to determine if the delay value satisfies the threshold 144, to provide the delay value associated with the read command 122 to the access device 170, to schedule read operation responsive to the read command 122, or a combination thereof. In some implementations, the function data may indicate whether one or more of the functions are to be performed contingent on the delay value being satisfied. For example, the function data may indicate that the delay value associated with the read command 122 is to be provided to the access device 170 regardless of the threshold 144 being satisfied. As another example, the function data may indicate that the read command 122 is to be scheduled regardless of the threshold 144 being satisfied. In some implementations, the function data may include or indicate the threshold 144.

The function data may include one or more bits (or one or more groups of bits) that each correspond to a different function. In some implementations the one or more bits may include a single bit (e.g., a flag bit) that indicates the controller 130 is to send the notification 150 in response to threshold being satisfied by the delay value. In other implementations, the one or more bits may include multiple bits. To illustrate, a first bit may indicate that the notification 150 is to be sent in response to the threshold 144 being satisfied, a second bit may indicate that the notification 150 is to include the delay value, and a third bit may indicate that the read operation (corresponding to the read command 122) is to be scheduled regardless of whether the threshold 144 is satisfied, as illustrative, non-limiting examples. For example, if a value of the third bit indicates that the read command 122 is to be scheduled regardless of whether the threshold 144 is satisfied, the controller may initiate processing of the read command 122 by scheduling the read operation (corresponding to the read command 122). Alternatively, if the value of the third bit indicates that the read command 122 is not to be scheduled if the threshold 144 is satisfied, the controller may initiate processing of the read command 122 without scheduling the read operation (corresponding to the read command 122) in response to a delay duration being greater than or equal to the threshold 144. In a particular implementation, the one or more bits may include a fourth bit (e.g., a flag) that indicates to abort (e.g., discard) the read command if the delay is greater than or equal to the threshold 144. Additionally or alternatively, the multiple bits may include a first set of bits that indicates a value of the threshold 144 to be satisfied.

For each memory operation executed by the storage device 102, the delay identifier 194 may set the operation timer 196 to an initial value and initiate operation of the operation timer 196 to track a memory operation duration corresponding to the memory operation. For example, the delay identifier 194 may set a value of the operation timer 196 to an initial value (e.g., an execution duration of the one or more memory operation parameters 146) and may initiate the operation timer 196 to count down (e.g., decrement) from the initial value. The value of the operation timer 196 may be associated with the amount of time before execution of the corresponding memory operation is complete.

In some implementations, the operation timer 196 that is configured to track a duration of an ongoing memory operation may be initialized to a value other than an execution duration of the ongoing memory operation. For example, in response to initiating execution of the ongoing memory operation, the delay identifier 194 may set a value of the operation timer 196 to an initial value (e.g., zero) and may initiate the operation timer 196 to increment the value to track the memory operation duration. In response to receiving the read command 122 and identifying the ongoing memory operation, the delay identifier 194 may determine a difference between the value of the operation timer 196 (when the command is received) and the execution duration of the ongoing memory operation. The difference between the value of the operation timer 196 (when the command is received) and the execution duration of the ongoing memory operation may be associated with the delay value of the read operation (corresponding to the read command 122). In some implementations, the comparator 198 may be configured to compare the difference value to the threshold 144. If the difference value is greater than or equal to the threshold 144, the controller 130 may send the notification to the access device 170.

In some implementations, after receiving the notification 150 corresponding to the read command 122, the access device 170 may be configured to generate and send the second read command 124 associated with the redundant data 108. The second read command 124 may be processed as described with reference to the read command 122 being processed. For example, a device, such as the storage device 102 or another storage device, that receives the second read command 124 may determine a second delay value associated with a second read operation (corresponding to the second read command 124). The device may determine whether the second delay value satisfies the threshold 144. In some implementations, the second read command 124 may be received by the device and the second read operation may be scheduled for execution by the device without determining the second delay value and/or without determining whether the second delay value satisfies the threshold 144.

In some implementations, if the controller 130 is configured to schedule the read operation (corresponding to the read command 122) in addition to sending the notification 150, the access device 170 (e.g., the processor 174) may be configured to receive the data 106 from the storage device 102 responsive to the read command 122 (and after receipt of the notification 150). The data 106 may be received before or after the redundant data 108 is received responsive to the second read command. If the data 106 is received before the redundant data 108 is received, the access device 170 may send a cancel command to cancel execution of a second read operation (corresponding to the second read command 124). In some implementations, the access device 170 may receive both the data 106 and the redundant data 108.

Additionally or alternatively, if the controller 130 is configured to schedule the read command 122 in addition to sending the notification 150, the access device 170 (e.g., the processor 174) may be configured to send a cancel command to the storage device 102 after receipt of the notification 150. The cancel command may cause the controller 130 to cancel execution of the read command 122. For example, the access device 170 may send the cancel command to the storage device 102 in conjunction with sending the second read command 124. As another example, the access device 170 may send the cancel command to the storage device 102 after receiving the redundant data 108 responsive to the second read command.

In some implementations, the controller 130 may be configured to not schedule the read operation (corresponding to the read command 122) if the delay value satisfies the threshold 144. In such implementations, the access device 170 (e.g., the processor 174) may be configured to resend the read command 122 to the storage device 102 after receipt of the notification 150. The access device 170 may resend the read command 122 prior to or concurrently with sending the second read command 124. For example, in response to receiving the notification 150, the access device 170 may resend the read command 122 and may send the second read command 124 to request the redundant data 108.

In some implementations, the storage device 102 may send the notification 150 to the access device 170 prior to an end of a timeout period corresponding to the read command 122 (e.g. the read operation). By sending the notification 150 prior to the end of the timeout period, the access device 170 may be able to initiate the second read command 124 to request the redundant data 108 earlier than and without having to wait for the end of the timeout period.

In some implementations, the storage device 102 and the access device 170 may exchange operational capabilities during a start-up or initialization procedure. For example, based the storage device 102 and the access device 170 being communicatively coupled, the storage device 102 may indicate to the access device 170 whether the storage device 102 can determine a delay value associated with a received command, whether the storage device 102 can send a notification associated with the delay value, whether the storage device 102 includes the one or more memory operation parameters 146, as illustrative, non-limiting examples. Additionally or alternatively, the access device 170 may indicate (or set) at least one operational function of the storage device 102. For example, the access device 170 may send a message or a signal to the storage device 102 to cause the storage device 102 to determine a delay value associated with one or more commands the access device 170. To illustrate, the access device 170 may cause the storage device 102 to provide a delay value for each read command received by the storage device. As another example, the access device 170 may cause the storage device 102 to discard a particular read command if a corresponding delay value satisfies the threshold 144.

In some implementations, the firmware 142, the threshold 144, and/or the one or more memory operation parameters 146 may be stored at the memory 104. In other implementations, the controller 130 may include or may be coupled to a particular memory, such as a random access memory (RAM), that is configured to store the firmware 142, the threshold 144, and/or the one or more memory operation parameters 146. Alternatively, or in addition, the controller 130 may include or may be coupled to another memory (not shown), such as a non-volatile memory, a RAM, or a read only memory (ROM). The other memory may be a single memory component, multiple distinct memory components, and/or may include multiple different types (e.g., volatile memory and/or non-volatile) of memory components. In some implementations, the other memory may be included in the access device 170.

In some implementations, the storage device 102 may be attached to or embedded within one or more access devices, such as within a housing of the access device 170. For example, the storage device 102 may be embedded within the access device 170, such as in accordance with a Joint Electron Devices Engineering Council (JEDEC) Solid State Technology Association Universal Flash Storage (UFS) configuration. For example, the storage device 102 may be configured to be coupled to the access device 170 as embedded memory, such as eMMC® (trademark of JEDEC Solid State Technology Association, Arlington, Va.) and eSD, as illustrative examples. To illustrate, the storage device 102 may correspond to an eMMC (embedded MultiMedia Card) device. As another example, the storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). To further illustrate, the storage device 102 may be integrated within an apparatus (e.g., the access device 170), such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory.

In other implementations, the storage device 102 may be implemented in a portable device configured to be selectively coupled to one or more external access devices. For example, the storage device 102 may be removable from the access device 170 (i.e., "removably" coupled to the access device 170). As an example, the storage device 102 may be removably coupled to the access device 170 in accordance with a removable universal serial bus (USB) configuration. In still other implementations, the storage device 102 may be include or may be a component (e.g., a solid-state drive (SSD)) of a network accessible data storage system, such as an enterprise data system, a network-attached storage system, a cloud data storage system, etc.

In some implementations, the storage device 102 may include or correspond to a solid-state drive (SSD) which may be included in, or distinct from (and accessible to), the access device 170. For example, the storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the storage device 102 is coupled to the access device 170 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the storage device 102 may be a network-attached storage (NAS) device or a component (e.g., a solid-state drive (SSD) device) of a data center storage system, an enterprise storage system, or a storage area network.

The storage device 102 may operate in compliance with a JEDEC industry specification. For example, the storage device 102 may operate in compliance with a JEDEC eMMC specification, a JEDEC Universal Flash Storage (UFS) specification, one or more other specifications, or a combination thereof. In some implementations, the storage device 102 and the access device 170 may be configured to communicate using one or more protocols, such as an eMMC protocol, a universal flash storage (UFS) protocol, a universal serial bus (USB) protocol, a serial advanced technology attachment (SATA) protocol, a peripheral component interconnect express (PCIe), a non-volatile memory express (NVMe), and/or another protocol, as illustrative, non-limiting examples.

In some implementations, the storage device 102 (or the access device 170) may include an error correction code (ECC) engine (not shown). The ECC engine may be configured to receive data, such as the data 160, and to generate one or more ECC code words (e.g., including a data portion and a parity portion) based on the data. For example, the ECC engine may receive the data 160 and may generate a codeword. To illustrate, the ECC engine may include an encoder configured to encode the data using an ECC encoding technique. The ECC engine may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

The ECC engine may include a decoder configured to decode data read from the memory 104 to detect and correct bit errors that may be present in the data. For example, the ECC engine may correct a number of bit errors up to an error correction capability of an ECC technique used by the ECC engine. In some implementations, the ECC engine may be configured to determine and/or track a failed bit count (FBC), a syndrome weight, a bit error rate, or both, corresponding to data decoded by the ECC engine. The ECC engine may be included in the controller 130 or in the memory device 103. In some implementations, the ECC engine may be included in the access device 170.

Although one or more components of the storage device 102 have been described with respect to the controller 130, in other implementations certain components may be included in the memory device 103 (e.g., the memory 104). For example, one or more of the delay identifier 194, the scheduler 190, and/or the ECC engine (not shown) may be included in the memory device 103. Alternatively, or in addition, one or more functions as described above with reference to the controller 130 may be performed at or by the memory device 103. For example, one or more functions of the delay identifier 194, the scheduler 190, and/or the ECC engine may be performed by components and/or circuitry included in the memory device 103.

Alternatively, or in addition, one or more components of the storage device 102 may be included in the access device 170. For example, one or more of the delay identifier 194, the scheduler 190, and/or the ECC engine may be included in the access device 170 and may be provided from the access device 170 to the controller 130 upon power-up of the storage device 102. Alternatively, or in addition, one or more functions, as described above with reference to the controller 130, may be performed at or by the access device 170. As an illustrative, non-limiting example, the access device 170 may be configured to send the read command 122 to the storage device 102 and receive a delay value associated with the read command 122. The access device 170 may be configured to compare the delay value to the threshold 144, such as the threshold 144.

The system 100 described with reference to FIG. 1 enables the storage device 102 to estimate a delay value associated with a received command. By determining the delay value, the storage device 102 may inform the access device 170 how long it will be busy before it is able to execute the received command (e.g., how long execution of the received command is estimated to be delayed). By sending the notification 150 associated with the delay value, the access device 170 may determine an alternative action to address the delay. To illustrate, in response to identifying that a the delay value associate with the read command 122 satisfies a threshold, the access device 170 may generate the second read command 124 to request the redundant data 108. In response to the second read command 124, the access device 170 may receive the redundant data 108 and reconstruct the data 106 (corresponding to the read command 122) based on the redundant data 108. Accordingly, by requesting the redundant data 108 and reconstructing the data 106, the access device 170 may obtain the data 106 more quickly through use of the second read command 124 than waiting to receive the data 106 responsive to the read command 122.

Figure 2:
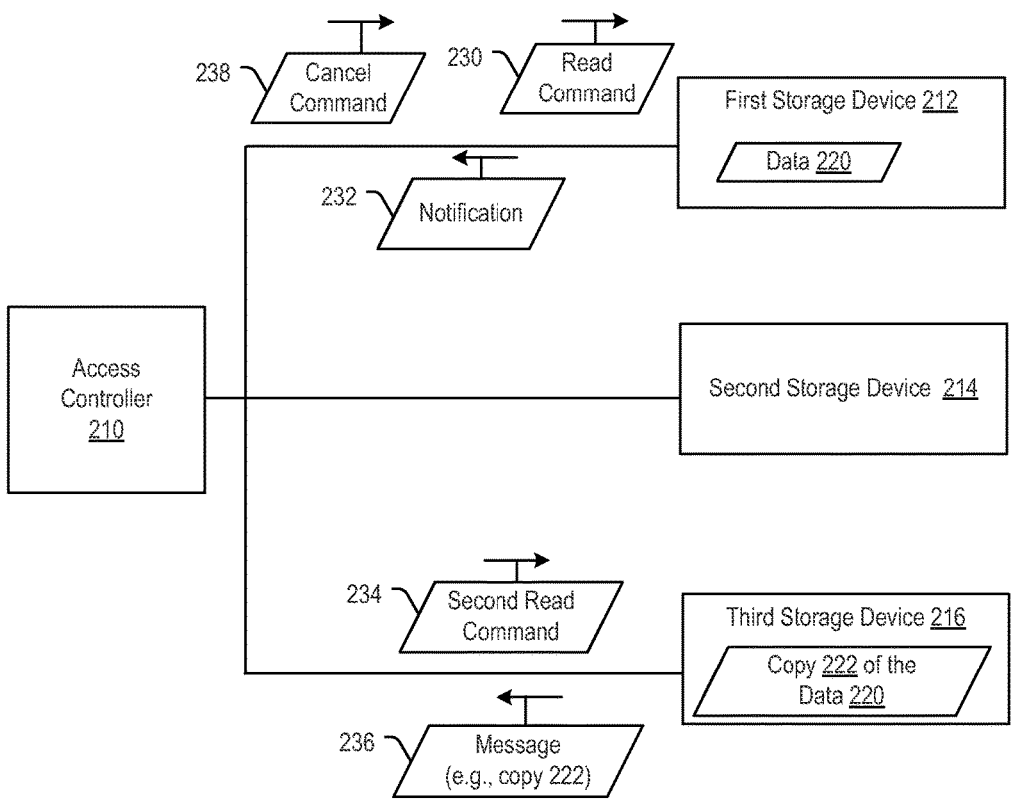
FIG. 2 is a block diagram of a first illustrative example of a system configured to access redundant data.

Referring to FIG. 2, a first illustrative example of a system 200 configured to access redundant data is depicted. The system 200 includes an access controller 210 and multiple storage devices. The access controller 210 may include or correspond to the access device 170 (e.g., the processor 174) of FIG. 1. Each of the multiple storage devices may include or correspond to the storage device 102 of FIG. 1. The multiple storage devices may form a memory array that is accessible by the access controller 210.

The multiple storage devices may include a first storage device 212, a second storage device 214, and a third storage device 216. Each of the multiple storage devices may include a memory and a controller. The memory and the controller may include or correspond to the memory device 103 and the controller 130, respectively, of FIG. 1. The first storage device 212 may include data 220 and the third storage device 216 may include a copy 222 of the data 220. Although the system 200 is described as having three storage devices, in other implementations, the system 200 may include fewer than or more than three storage devices. Each of the multiple storage devices may include or correspond to a solid-state drive (SSD) and may be accessed in parallel with at least on other storage device of the multiple storage devices. In some implementations, the multiple storage devices may have a RAID configuration, such as a RAID 1 configuration, a RAID 5 configuration, a RAID 6 configuration, a RAID 10 configuration, a RAID 15 configuration, a RAID 16 configuration, a RAID 51 configuration, or another RAID configuration.

The access controller 210 may issue commands to the multiple storage devices, such as one or more requests to erase data, read data from, or write data. For data stored at the multiple storage devices, the access controller 210 may be to identify one or more storage locations of the multiple storage devices associated with the data. To illustrate, the access controller 210 may include or have access to a tracking table, such as the data tracking table 178 of FIG. 1, that indicates at least a first storage location of the data 220 and a second storage location of the copy 222 of the data 220.

During operation, of the system 200, the access controller 210 (e.g., a processor) may be configured to generate the read command 230 corresponding to the data 220 stored at the first storage device 212. To illustrate, the data 220 may be stored at a first storage location of a memory (e.g., a non-volatile memory) of the first storage device 212.

Responsive to the read command 230, the first storage device 212 may determine a delay value associated with a time of executing the read command 230. The delay value may correspond to an estimated amount of time between when the read command 230 is received and when execution of the read command 230 is expected to begin, as described with reference to FIG. 1. For example, the delay may be determined based on an amount of time (e.g., an estimated amount of time) before execution of an ongoing memory operation is completed (and the read command 230 can be executed).

The first storage device 212 may be configured to generate and to send a notification 232 to access controller 210 based on the delay value. In some implementations, the first storage device 212 may send the notification 232 that includes the delay value. Additionally or alternatively, the first storage device 212 may generate and send the notification 232 to the access controller 210 in response to determining that the delay value satisfies (e.g., is greater than or equal to) a threshold. In some implementations, the first storage device 212 may be configured to schedule the read command 230 for execution regardless of the delay value. In other implementations, the first storage device 212 may be configured to not schedule the read command 230 for execution if the delay value satisfies the threshold.

In response to receiving the notification 232, the access controller 210 may identify the third storage device 216 that includes a redundant version of the data 220, such as the copy 222 of the data 220. The access controller 210 may generate and send a second read command 234 to the third storage device 216. The second read command 234 may correspond to the copy 222 stored at the third storage device 216. In some implementations, the access controller 210 may send the second read command 234 prior to expiration of a timeout period corresponding to the read command 230.

The third storage device 216 may receive the second read command 234 and may schedule the second read command 234 for execution. The second read command 234 may be executed to cause the copy 222 to be read from a memory of the third storage device 216 and the copy 222. The third storage device 216 may send a message 236 that includes a representation of the copy 222 to the access controller 210. In response to receiving the message 236, the access controller 210 may send a cancel command 238 to the first storage device 212 to cancel execution (e.g., scheduled execution) of the read command 230.

In some implementations, in response to receiving the second read command 234, the third storage device 216 may determine a second delay value associated with the second read command 234. The third storage device 216 may be configured to send a second notification (not shown) to the access controller 210 that includes the second delay value. Additionally or alternatively, the third storage device 216 may generate and send the second notification to the access controller 210 in response to determining that the second delay value satisfies (e.g., is greater than or equal to) the threshold. In some implementations, the third storage device 216 may be configured to schedule the second read command 234 for execution regardless of the second delay value. In other implementations, the third storage device 216 may be configured to not schedule the second read command 234 for execution if the delay value satisfies the threshold.

In some implementations, the first storage device 212 may schedule the read command 230 for execution regardless of the delay value and the third storage device 216 may schedule the second read command 234 for execution regardless of the second delay value. In such implementations, the access controller 210 may wait to receive a representation of the data 220 from the first storage device 212 or to receive a representation of the copy 222 from the third storage device 216. If the representation of the data 220 is received first, the access controller 210 may subsequently receive the representation of the copy 222 or may send a cancel command to the third storage device 216 to cancel execution of the second read command 234. Alternatively, if the representation of the copy 222 is received first, the access controller 210 may subsequently receive the representation of the data 220 or may send a cancel command to the first storage device 212 to cancel execution of the read command 230.

In some implementations the first storage device 212 may not schedule the read command 230 based on the delay value and the third storage device 216 may not schedule the second read command 234 based on the second delay value. In this implementation, the access controller 210 may resend the read command 230 to the first storage device 212, may resend the second read command 234 to the third storage device 216, or both. To illustrate, the access controller 210 may receive the delay value (associated with the read command 230) included in the notification 232 and may receive the second delay value (associated with the second read command 234) in the second notification. Based on the delay value and the second delay value, the access controller 210 may select one of the first storage device 212 or the third storage device 216 for resending of a corresponding read command. To illustrate, based on the delay value, the access controller 210 may determine a first time that corresponds to an end of a first delay period associated with the read command 230. Based on the second delay value, the access controller 210 may determine a second time that corresponds to an end of a second delay period associated with the second read command 234. If the first time is closer to a present time than the second time, the access controller 210 may resend the read command 230 to the first storage device 212. However, if the second time is close to the present time than the first time, the access controller may resend the read command 230 to the third storage device 216. If the first time and the second time are the same time, the access controller 210 may resend either (or both) of the read command 230 and the second read command 234. In a particular implementation, if the first time and the second time are the same time, the access controller 210 may resend the read command 230 for the data 220 and may not send the second read command 234 for the redundant data (e.g., the copy 222).

In a particular implementation, the first storage device 212 may schedule the read command 230 for execution regardless of the delay value. In response to receiving the notification 232, the access controller 210 may send the second read command 234 to the third storage device 216. If the second delay value is greater than or equal to the threshold, the third storage device 216 may not schedule the second read command 234 and the access controller may wait to receive the representation of the data 220 from the first storage device 212. Alternatively, if the second delay value is less than the threshold, the third storage device 216 may schedule execution of the second read command 234. If the representation of the data 220 is received first, the access controller 210 may subsequently receive the representation of the copy 222 or may send a cancel command to the third storage device 216 to cancel execution of the second read command 234. Alternatively, if the representation of the copy 222 is received first, the access controller 210 may subsequently receive the representation of the data 220 or may send a cancel command to the first storage device 212 to cancel execution of the read command 230.

Thus, the system 200 described with reference to FIG. 2 enables the access controller 210 to be notified if execution of the read command 230 to request data at the first storage device 212 is delayed. By notifying the access controller 210 of a delay in execution of the read command 230 the access controller 210 can send an additional read command (e.g., the second read command 234) to request redundant data, such as the copy 222 stored at the third storage device 216. Responsive to the second read command 234 the access controller 210 may receive a representation of the redundant data (e.g. the copy 222) more quickly than the access controller 210 is able to receive the data 220 from first storage device 212.

Figure 3:
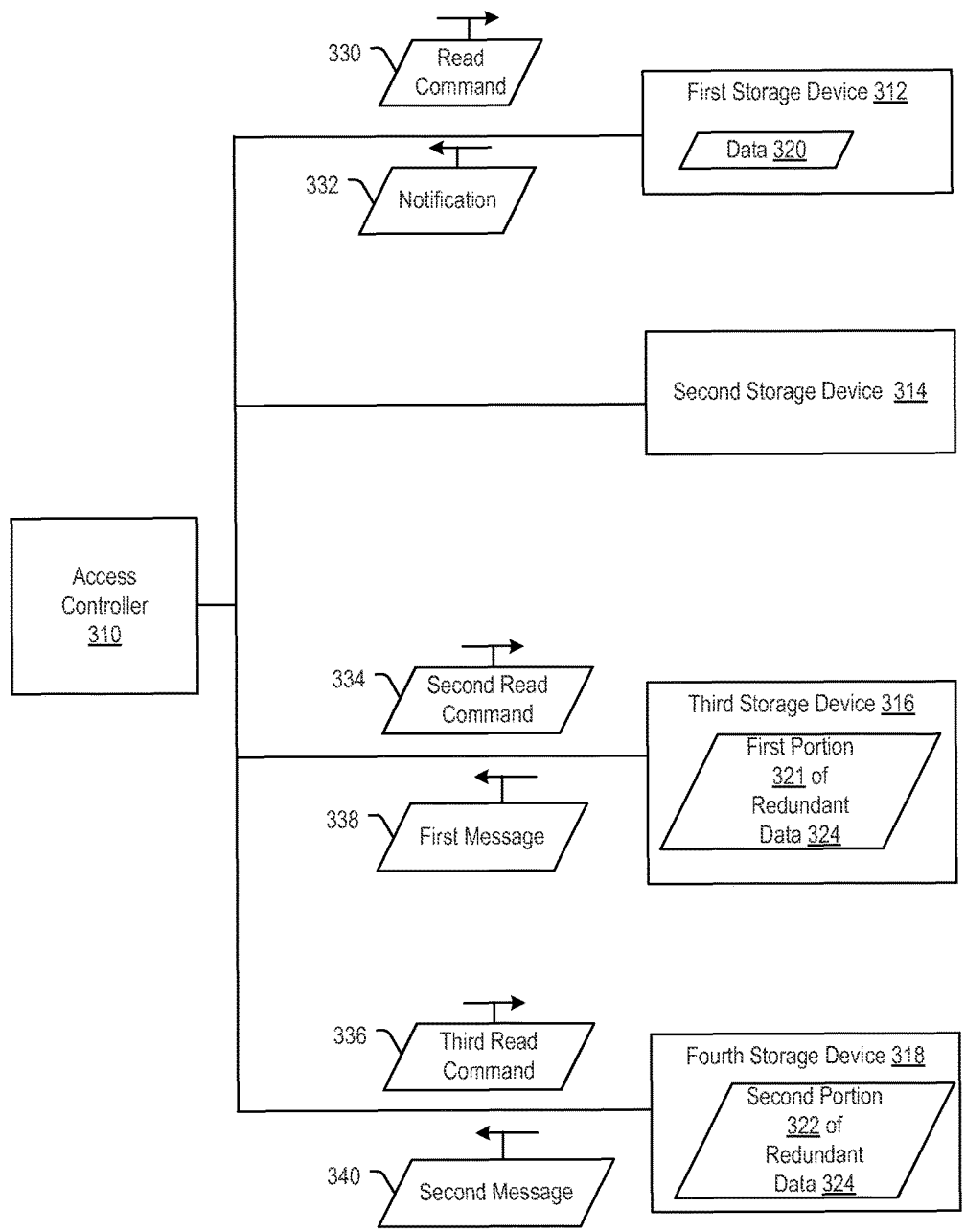
FIG. 3 is a block diagram of a second illustrative example of a system configured to access redundant data.

Referring to FIG. 3, a second illustrative example of a system 300 configured to access redundant data is depicted. The system 300 includes an access controller 310 and multiple storage devices. The access controller 310 may include or correspond to the access device 170 (e.g., the processor 174) of FIG. 1 or the access controller 210 of FIG. 2. Each of the multiple storage devices may include or correspond to the storage device 102 of FIG. 1 or the multiple storage devices 212-216 of FIG. 2. The multiple storage devices may form a memory array that is accessible by the access controller 310.

The multiple storage devices may include a first storage device 312, a second storage device 314, a third storage device 316, and a fourth storage device 318. Each of the multiple storage devices 312-318 may include a memory and a controller. The memory and the controller may include or correspond to the memory device 103 and the controller 130, respectively, of FIG. 1. The first storage device 312 may include data 320, the third storage device 316 may include a first portion 321 of redundant data 324, and the fourth storage device 318 may include a second portion 322 of the redundant data 324. Although the system 300 is described as having four storage devices, in other implementations, the system 300 may include fewer than or more than four storage devices. Each of the multiple storage devices may include or correspond to a solid-state drive (SSD) and may be accessed in parallel with at least on other storage device of the multiple storage devices. In some implementations, the multiple storage devices 312-318 may have a RAID configuration, such as a RAID 1 configuration, a RAID 5 configuration, a RAID 6 configuration, a RAID 10 configuration, a RAID 15 configuration, a RAID 16 configuration, a RAID 51 configuration, or another RAID configuration.

The access controller 310 may issue commands to the multiple storage devices 312-318, such as one or more requests to erase data, read data from, or write data. For data stored at the multiple storage devices 312-318, the access controller 310 may be to identify one or more storage locations of the multiple storage devices 312-318 associated with the data. To illustrate, the access controller 310 may include or have access to a tracking table, such as the data tracking table 178 of FIG. 1, that indicates at least a first storage location of the data 320, a second storage location of the first portion 321 of the redundant data 324, and a third storage location of the second portion 322 of the redundant data 324.

During operation, of the system 300, the access controller 310 (e.g., a processor) may be configured to generate the read command 330 corresponding to the data 320 stored at the first storage device 312. The data 320 may include or correspond to the data 106 of FIG. 1 or the data 220 of FIG. 2.

Responsive to the read command 330, the first storage device 312 may determine a delay value associated with a time of executing the read command 330. The delay value may correspond to an estimated amount of time between when the read command 330 is received and when execution of the read command 330 is expected to begin, as described with reference to FIG. 1.

The first storage device 312 may generate and send a notification 332 to access controller 310 based on the delay value. In some implementations, the first storage device 312 may send the notification 332 that includes the delay value. Additionally or alternatively, the first storage device 212 may generate and send the notification 332 to the access controller 310 in response to determining that the delay value satisfies (e.g., is greater than or equal to) a threshold, such as the threshold 144 of FIG. 1.

In response to receiving the notification 332, the access controller 310 may identify one or more storage location that store the redundant data 324, such as the redundant data 108 of FIG. 1 or the copy 222 of FIG. 2. For example, the access controller 310 may identify the second storage location of the third storage device 316 that stores the first portion 321 and the third storage location of the fourth storage device 318 that stores the second portion 322. The access controller 310 may generate a second read command 334 to request the first portion 321 and generate a third read command 336 to request the second portion 322. The first portion 321 and the second portion 322 may include at least a partial copy of the data 320, parity bits corresponding to the data 320, a compressed or encoded version of the data 320, or a combination thereof, as illustrative, non-limiting examples. To illustrate, the first portion 321 of the redundant data 324 may include a first partial copy of the data 320 and a first set of parity bits. The second portion 322 of the redundant data 324 may include a second partial copy of the data 320 and a second set of parity bits. The access controller 310 may send the second read command 334 to the third storage device 316 and may send the third read command 336 to the fourth storage device 318.

The third storage device 316 may send a first message 338 to the access controller 310 responsive to the second read command 334. The first message 338 may include a representation of the first portion 321 of the redundant data 324. The fourth storage device 318 may send a second message 340 to the access controller 310 responsive to the third read command 336. The second message 340 may include a representation of the second portion 322 of the redundant data 324.

In response to receiving the first message 338 and the second message 340, the access controller 310 may recover the data 320 based on the representation of the first portion 321 and the representation of the second portion 322. As an illustrative, non-limiting example, the data 320 recovered by the access controller 310 may be generated (by the access controller 310) based in part on the second portion of the redundant data. Thus, the system 300 described with reference to FIG. 3 enables the access controller 310 to request redundant data stored at multiple storage devices in response to receiving the notification 332.

As another illustrative example of the system 300, the system 300 may include 'n+1' storage devices coupled to the access controller 310, where n is a positive integer. The n+1 storage devices may have a RAID 5 configuration in which each of n devices stores corresponding data and the (n+1)th storage device stores parity data (generated based on the data stored at the n devices). To illustrate, the data from each of the n devices may be exclusive OR'd (XOR'd) to generate the parity data stored at the (n+1)th storage device. In response to a determination that particular data at a particular storage device of the n storage devices is unavailable (or corrupt), the access controller 310 may recover (e.g., re-create) the particular data by reading data from the n storage devices (other than the particular storage device) and by reading the parity data from the (n+1)th storage device.

Figure 4:
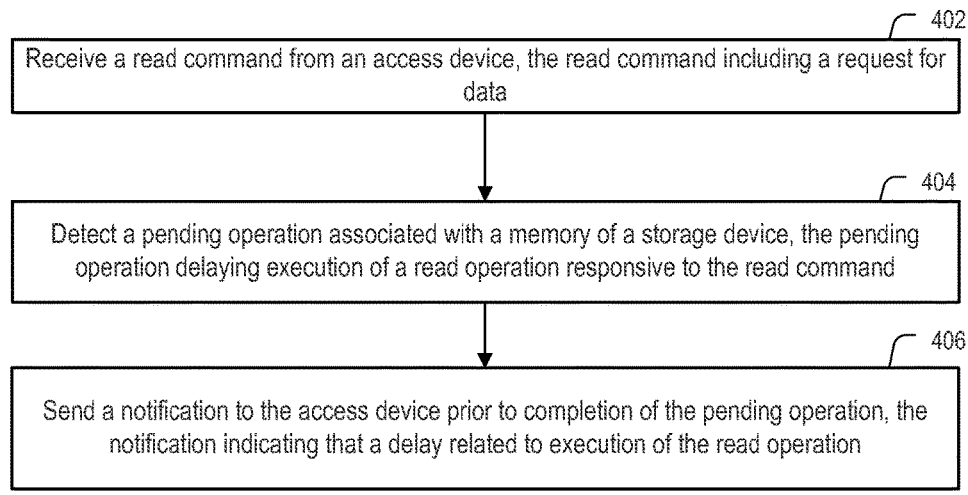
FIG. 4 is a flowchart of a particular illustrative example of a method of operating a storage device.

Referring to FIG. 4, a particular illustrative example of a method of a method of operating a storage device is depicted and generally designated 400. The method 400 may be performed at the storage device 102, such as the controller 130 or the memory device 103, of FIG. 1, the storage devices 212-216, the storage devices 312-318, or a combination thereof, as illustrative, non-limiting examples.

The method 400 includes receiving a read command from an access device, the read command including a request for data, at 402. For example, the data may include or correspond to the data 106 of FIG. 1, the data 220 of FIG. 2, or the data 320 of FIG. 3. The read command may include or correspond to the read command 122 of FIG. 1, the read command 230 of FIG. 2, or the read command 330 of FIG. 3. The access device may include or correspond to the access device 170 (e.g., the processor 174) of FIG. 1, the access controller 210 of FIG. 2, or the access controller 310 of FIG. 3. The data may be stored at a memory, such as a non-volatile memory of a storage device. For example, the memory may include the memory 104 of FIG. 1. The non-volatile memory may include a flash memory. In some implementations, the non-volatile memory may include a three-dimensional (3D) memory configuration that is monolithically formed in one or more physical levels of arrays of storage elements having an active area disposed above a silicon substrate. Circuitry associated with operation of the storage elements may be included in or coupled to the non-volatile memory.

The method 400 also includes detecting a pending operation associated with a memory of a storage device, the pending operation delaying execution of a read operation responsive to the read command, at 404. For example, the pending operation may include or correspond to the pending operation 191 of FIG. 1. The pending operation may be detected in response to the read command being received. In some implementations, the pending operation is being executed at the memory (e.g., the non-volatile memory) of the storage device at the time of receiving the read command. In other implementations, the pending operation is scheduled for execution at the time of receiving the read command. The pending operation may include a single operation or multiple operations. For example, the pending operation may include a write operation, an erase operation, a data recovery operation, a data move operation, a data refresh operation, a background operation, or a combination thereof, as illustrative, non-limiting examples.

The method 400 includes sending a notification to the access device prior to completion of the pending operation, the notification indicating a delay related to execution of the read operation, at 406. For example, the notification may include or correspond to the notification 150 of FIG. 1, the notification 232 of FIG. 2, or the notification 332 of FIG. 3. The notification may indicate a delay duration related to a time of starting execution of the read operation. Additionally or alternatively, the notification may indicate that the delay related to the execution of the read operation is greater than or equal to a threshold. In some implementations, the notification may include first data that indicates execution of the read operation is delayed, second data that indicates a duration of the delay, third data that indicates whether the read operation is scheduled for execution, fourth data that indicates a threshold to be compared to the duration of the delay, or a combination thereof.

In some implementations, responsive to sending the notification, the method 400 may further include receiving a second read command from the access device to access redundant data (or a portion of the redundant data). For example, the redundant data may include or correspond to the redundant data 108 of FIG. 1, the copy 222 of FIG. 2, or the redundant data 324 of FIG. 3. The method 400 may also include performing a second read operation responsive to the second read command. In some implementations, a representation of the redundant data may be sent to the access device prior to completion of the pending operation. Additionally or alternatively, the method 400 may include receiving, from the access device, a cancel command associated with the read command. Responsive to the cancel command, a scheduled execution of the read operation may be canceled at the storage device.

In some implementations, execution of the read operation may be scheduled by a scheduler, such as the scheduler 190 of FIG. 1. The storage device may initiate execution of the read operation and receive a representation of the data from the memory (e.g., the non-volatile memory) responsive to execution of the read operation. The representation of the data may be provided to the access device.

In some implementations, the method 400 may include determining an estimated amount of time until completion of the pending operation. The delay (e.g., a delay duration) may be determined based on the estimated amount of time. In some implementations, the method 400 may include, in response to a delay duration of the delay being greater than or equal to the threshold, initiating processing of the read command without scheduling the read operation.

In some implementations, a controller of the storage device may be configured to determine whether the read command comprises a flag, such as a data bit. The flag may indicate to abort the read command if the delay is greater than or equal to the threshold. Additionally or alternatively, the storage device may include a timer and a comparator. The timer, such as the operation timer 196 of FIG. 1, may be configured to indicate an amount of time left to complete execution of the pending operation. The comparator, such as the comparator 198 of FIG. 1, configured to compare a value of the timer to a threshold. Additionally or alternatively, the storage device may include a second timer, such as the timeout timer 193 of FIG. 1. The second timer may be configured to indicate a timeout associated with the read operation. In response to the timeout, the storage device may send a timeout indication to the access device.

By sending the notification to the access device, the method 400 may inform the access device of the delay related to execution of the read operation. Additionally, by sending the notification to inform the access device of the delay, the storage device may enable the access device to determine an alternative action to address the delay. For example, the access device may request redundant data which may be received by the access device more quickly than data that is responsive to the read operation.

Figure 5:
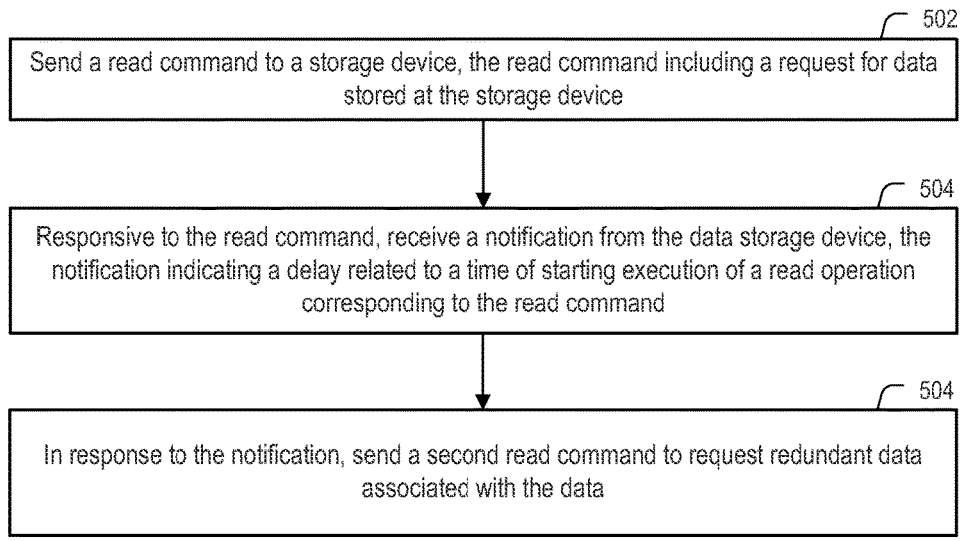
FIG. 5 is a flowchart of a particular illustrative example of a method of operating a device to request redundant data.

Referring to FIG. 5, a particular illustrative example of a method of operating a device to request redundant data is depicted and generally designated 500. The method 500 may be performed at the access device 170 (e.g., the processor 174) of FIG. 1, the access controller 210 of FIG. 2, the access controller 310 of FIG. 3, or a combination thereof, as illustrative, non-limiting examples.

The method 500 includes sending a read command to a storage device, the read command associated with data stored at the storage device, at 502. For example, the storage device, such as a solid-state drive, may include or correspond to the storage device 102, such as the controller 130 or the memory device 103, of FIG. 1, the storage devices 212-216, the storage devices 312-318, or a combination thereof. The read command may include or correspond to the read command 122 of FIG. 1, the read command 230 of FIG. 2, or the read command 330 of FIG. 3. The data may include or correspond to the data 106 of FIG. 1, the data 220 of FIG. 2, or the data 320 of FIG. 3. In some implementations, the access device (e.g., the processor) may generate the read command that includes first data that indicates whether the read operation is to be executed regardless of the delay, second data indicating a request for a duration of the delay, or a combination thereof.

The method 500 also includes, responsive to the read command, receiving a notification from the storage device, the notification indicating an estimated amount of time until execution of the read command is greater than or equal to a threshold, at 504. For example, the notification may include or correspond to the notification 150 of FIG. 1, the notification 232 of FIG. 2, or the notification 332 of FIG. 3.

The method 500 also includes, responsive to the notification, sending a second read command prior to expiration of a timeout period corresponding to the read command, the second read command corresponding to redundant data associated with the data, at 506. For example, the second read command may include or correspond to the second read command 124 of FIG. 1, the second read command 234 of FIG. 2, the second read command 334, or the third read command 336 of FIG. 3. The redundant data may include or correspond to the redundant data 108 of FIG. 1, the copy 222 of FIG. 2, or the redundant data 324 of FIG. 3.

In some implementations, the method 500 further includes receiving (at the processor of the access device) the redundant data via an interface of the access device. For example, the interface may include or correspond to the interface 172 of FIG. 1. The interface may be configured to multiple data storage devices that have a redundant array of independent disks (RAID) configuration. The RAID configuration may include a RAID 1 configuration, a RAID 5 configuration, a RAID 6 configuration, a RAID 10 configuration, a RAID 15 configuration, a RAID 16 configuration, a RAID 51 configuration, or another RAID configuration. The access device may include a memory that stores a data tracking table that indicates a first storage location of the data and that indicates a second storage location of the redundant data.

In some implementations, after receipt of the notification, the method 500 may include resending the read command to the storage device or sending a cancel command to the storage device to cancel execution of a read operation that is responsive to the read command. Additionally or alternatively, the method 500 may include receiving the data from the storage device responsive to the read command (or the resent read command) after receipt of the notification. In some implementations, after sending the second read command, the method 500 may include receiving an indication of expiration of a timeout period corresponding to the read command from the storage device.

In a particular implementation, in response to receiving the notification, the method 500 may include identifying a second storage device that includes the redundant data. In this implementation, the redundant data may include at least a portion of a copy of the data. The second read command may be sent to the second storage device and the access device may receive at least the portion of the copy from the second storage device.

In another particular implementation, in response to receiving the notification, the method 500 may include identifying a second storage device that includes a portion of the redundant data associated with the data and identifying a third storage device that includes a second portion of the redundant data. In this implementation, the redundant data includes parity data of the data and the access device may receive the portion of the redundant data from the second storage device responsive to the second read command after receipt of the notification. The method 500 may also include sending a third read command to the third storage device to request the second portion stored at the third storage device and receiving the second portion of the redundant data from the third storage device. In some implementations, the method 500 may include recovering (e.g., generating) the data based in part on the portion of the redundant data, the second portion of the redundant data, or a combination thereof.

By receiving the notification from the storage device, the access device may be informed of the delay related to execution of the read operation. Accordingly, the method 500 enables the access device to identify and request redundant data which may be received by the access device more quickly than data that is responsive to the read operation.

Figure 6A:
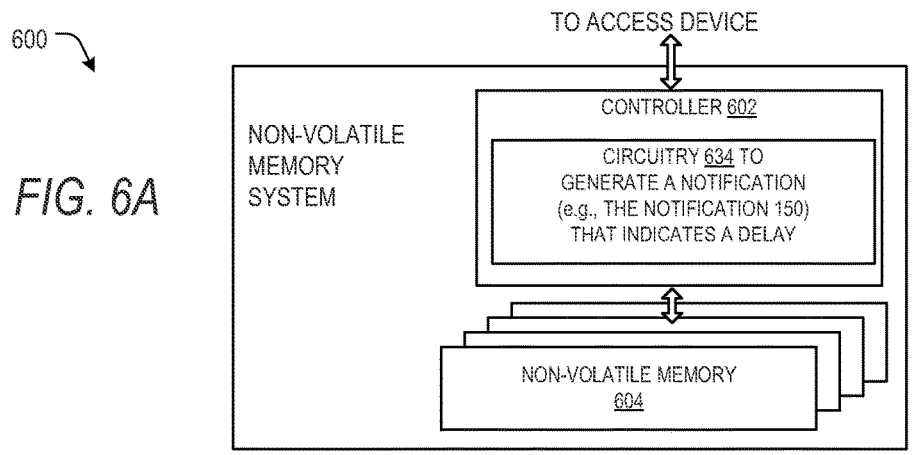
FIG. 6A is a block diagram of an illustrative example of a non-volatile memory system including a controller that includes circuitry to indicate at least a portion of a word line of a block to be skipped during future write operations to the block.
Figure 6B:
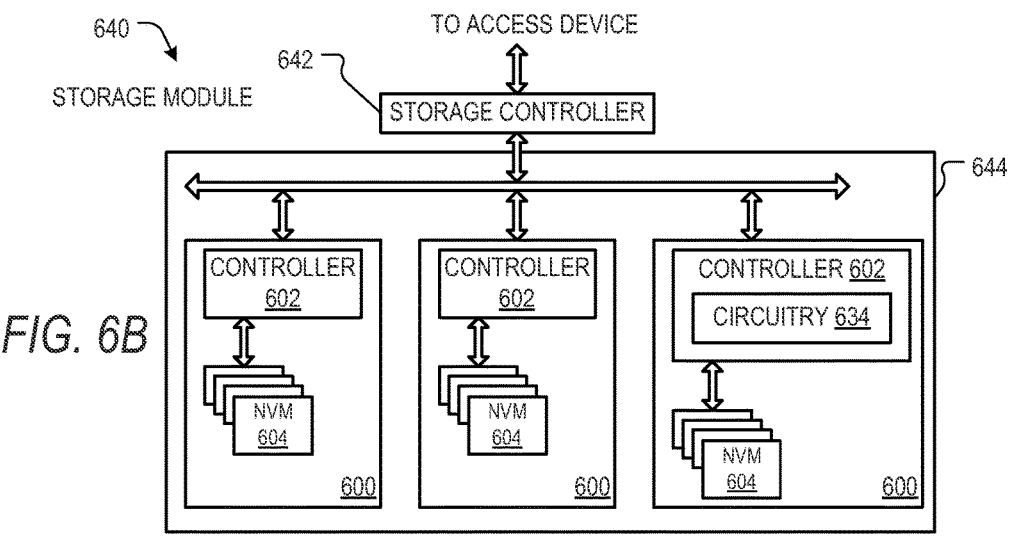
FIG. 6B is a block diagram of an illustrative example of a storage module that includes plural non-volatile memory systems that each may include a controller having circuitry to a portion of a word line of a block to be skipped during future write operations to the block.
Figure 6C:
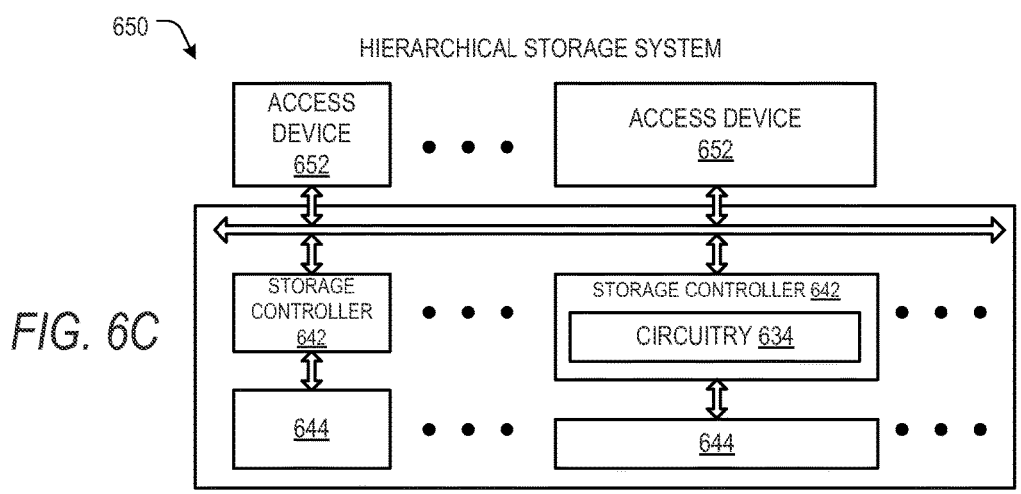
FIG. 6C is a block diagram of an illustrative example of a hierarchical storage system that includes a plurality of storage controllers that each may include circuitry to indicate a least a portion of a word line of a block to be skipped during future write operations to the block.

Memory systems suitable for use in implementing aspects of the disclosure are shown in FIGS. 6A-6C. FIG. 6A is a block diagram illustrating a non-volatile memory system 600 according to an aspect of the subject matter described herein. Referring to FIG. 6A, the non-volatile memory system 600 includes a controller 602 and non-volatile memory that may be made up of one or more non-volatile memory dies, including an illustrative non-volatile memory die 604. A "memory die" may refer to a collection of non-volatile memory cells, and associated circuitry for managing the physical operation of those non-volatile memory cells, that are formed on a single semiconductor substrate. The controller 602 interfaces with an access system, such as a host system, and transmits command sequences for read, program, and erase operations to non-volatile memory die 604. The non-volatile memory system 600 may include or correspond to the storage device 102 of FIG. 1, one of the storage devices 212-216, one of the storage devices 312-318, or a combination thereof. For example, the controller 602 and the non-volatile memory die 604 may include the controller 130 and the memory device 103, respectively, of FIG. 1.

The controller 602 includes circuitry 634 to generate a notification that indicates a delay. For example, the circuitry 634 may include the controller 130 (including the delay identifier 194) of FIG. 1. The notification may include or correspond to the notification 150 of FIG. 1, the notification 232 of FIG. 2, or the notification 332 of FIG. 3. In a particular non-limiting example, the circuitry 634 may detect a pending operation in response to receiving a read operation and may determine an estimated amount of time until completion of the pending operation. The pending operation may temporarily prohibit execution of a read operation to access requested data. In some implementations, the circuitry 634 may compare the estimated amount of time to a threshold, such as the threshold 144 of FIG. 1. The circuitry 634 may generate the notification indicating execution of the read operation is delayed (because of the pending operation). In some implementations the notification may indicate that a delay related to execution of the read operation is greater than or equal to the threshold (e.g., a threshold amount of time), may indicate (or include) a delay duration, such as a delay value, related to a time of starting execution of the read operation, or both. After generating the notification, the circuitry 634 may initiate sending of the notification to the access device (e.g., the access device that requested the read operation). In some implementations, the notification may be sent to the access device prior to completion of the pending operation at the non-volatile memory system 600.

The controller 602 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and/or an embedded microcontroller, as illustrative, non-limiting examples. The controller 602 can be configured with hardware and/or firmware to perform the various functions described and shown in the flow diagrams of FIGS. 4-5. Also, some of the components shown as being internal to the controller 602 can be stored external to the controller 602, and other components can be used. As used herein, the phrase "operatively in communication with" includes directly in communication with or indirectly (wired or wireless) in communication with through one or more components. As shown or described herein, the one or more components may be omitted from one or more illustration or from the description for ease of illustration or description.

As used herein, a flash memory controller is a device that manages data stored on flash memory and communicates with an access device, such as a computer or electronic device. A flash memory controller can have additional functionality other than the specific functionality described herein. For example, the flash memory controller can format a flash memory to ensure the flash memory is operating properly, map out bad flash memory cells, and allocate spare cells to be substituted for future failed cells. Some part of the spare cells can be used to hold firmware to operate the flash memory controller and implement other features. In operation, an access device, such as the access device 170 of FIG. 1, communicates with the flash memory controller to read data from or write data to the flash memory. If the access device provides a logical address to which data is to be read/written, the flash memory controller can convert the logical address received from the access device to a physical address in the flash memory. In an alternative implementation, the access device can provide the physical address to the flash memory controller. The flash memory controller can also perform various memory management functions, such as, but not limited to, wear leveling (distributing writes to avoid wearing out specific blocks of memory that would otherwise be repeatedly written to) and/or garbage collection (after a block is full, moving only the valid pages of data to a new block, so the full block can be erased and reused), as illustrative, non-limiting examples.

The non-volatile memory die 604 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 602 and the non-volatile memory die 604 may be any suitable interface, such as a Toggle Mode interface. In some implementations, non-volatile memory system 600 may be a card based system, such as a secure digital (SD) or a micro secure digital (micro-SD) card. Alternatively, in other implementations, the non-volatile memory system 600 may be part of an embedded memory system.

Although, in the example illustrated in FIG. 6A, the non-volatile memory system 600 (sometimes referred to herein as a storage module) includes a single channel between the controller 602 and the non-volatile memory die 604, the subject matter described herein is not limited to having a single memory channel. For example, in some NAND memory system architectures (such as shown in FIGS. 6B and 6C), two NAND channels, four NAND channels, eight NAND channels, or more than eight NAND channels may be positioned between the controller and the NAND memory device, depending on controller capabilities. In any of the examples described herein, more than a single channel may be positioned between the controller 602 and the non-volatile memory die 604, even if a single channel is shown in the drawings. Although the circuitry 634 is described as being included in the controller 602, in other implementations, a portion or an entirety of the circuitry 634 may be included in the non-volatile memory 604 or in the access device.

FIG. 6B illustrates a storage module 640 that includes a plurality of the non-volatile memory systems 600. As such, the storage module 640 may include a controller 602 that interfaces with an access device and with a storage system 644, which includes the plurality of the non-volatile memory systems 600. The interface between the storage controller 642 and the non-volatile memory systems 600 may be a bus interface, such as a serial advanced technology attachment (SATA) or a peripheral component interface express (PCIe) interface. In some implementations, the storage module 640 may be a solid-state drive (SSD) which may be found in portable computing devices, such as laptop computers and tablet computers, as illustrative, non-limiting examples. Each controller 602 of FIG. 6B may include circuitry, such as the circuitry 634. Alternatively or in addition, the storage controller 642 may include the circuitry 634, such as the skip module 134 of FIG. 1.

FIG. 6C is a block diagram illustrating a hierarchical storage system 650 that includes a plurality of the storage controllers 702, each of which controls a respective storage system 644. Access device systems 652 may access memories within the hierarchical storage system 650 via a bus interface. The bus interface may be a non-volatile memory (NVM) express (NVMe) or a fiber channel over Ethernet (FCoE) interface, as illustrative, non-limiting examples. In some implementations, the hierarchical storage system 650 illustrated in FIG. 6C may be a rack mountable mass storage system that is accessible by multiple access devices (e.g., host computers), such as would be found in a data center or other location where mass storage is needed. Each storage controller 642 of FIG. 6C may include the circuitry 634.

Figure 7A:
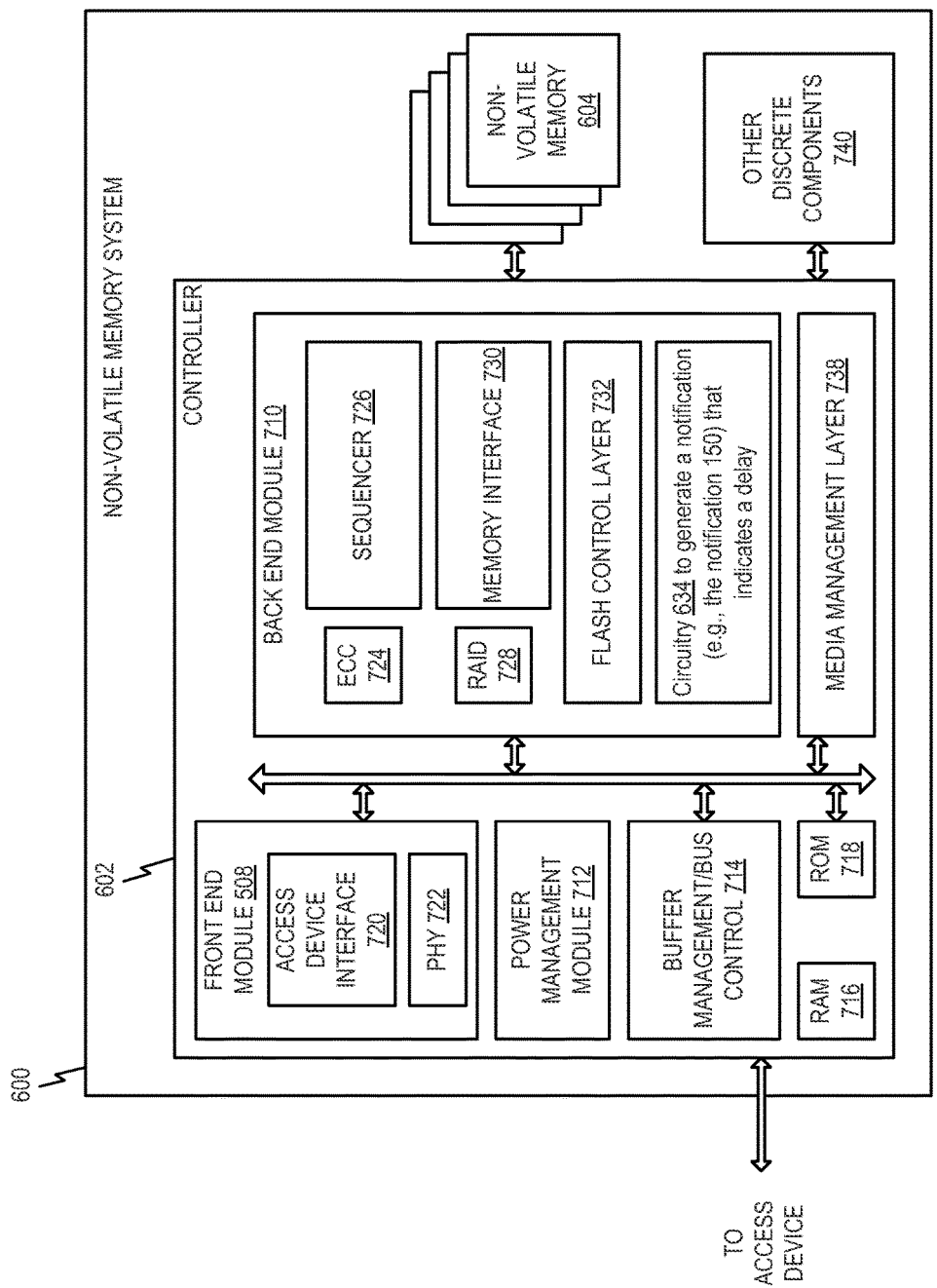
FIG. 7A is a block diagram of a first illustrative example of components included in the non-volatile memory system of FIG. 6A.

FIG. 7A is a block diagram illustrating exemplary components of the controller 602 in more detail. The controller 602 includes a front end module 708 that interfaces with an access device, a back end module 710 that interfaces with non-volatile memory dies (e.g., including the non-volatile memory die 604), and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 602, a buffer management/bus controller 714 manages buffers in a random access memory (RAM) 716 and controls internal bus arbitration of the controller 602. A read only memory (ROM) 718 stores system boot code. Although illustrated in FIG. 7A as located within the controller 602, in other implementations, one or both of the RAM 716 and the ROM 718 may be located externally to the controller 602. In other implementations, portions of the RAM 716 and/or the ROM 718 may be located both within the controller 602 and outside the controller 602.

The front end module 708 includes an access device interface 720 and a physical layer interface (PHY) 722 that provide an electrical interface with the access device or a next level storage controller. A type of access device interface 720 can depend on a type of memory being used. Examples of access device interface 720 include, but are not limited to, serial advanced technology attachment (SATA), SATA Express, serial attached small computer system interface (SAS), Fibre Channel, universal serial bus (USB), peripheral component interconnect express (PCIe), and NVMe. The access device interface 720 typically facilitates transfer for data, control signals, and timing signals, as illustrative, non-limiting examples. The access device interface 720 may include or correspond to the first interface 131 of FIG. 1.

The back end module 710 includes an error correction code (ECC) engine 724, such as the ECC engine 133 of FIG. 1, that is configured to encode data, such as data bytes, received from the access device, and to decode and error correct representations of the data (e.g., representations of the data bytes) read from non-volatile memory, such as the non-volatile memory die 604. The back end module 710 may also include the circuitry 634. A command sequencer 726 may generate command sequences, such as program and erase command sequences, to be transmitted to the non-volatile memory die 604. A redundant array of independent drives (RAID) module 728 manages generation of RAID parity and recovery of failed data. The RAID parity may be used as an additional level of integrity protection for the data being written into the non-volatile memory die 604. In some cases, the RAID module 728 may be a part of the ECC engine 724. A memory interface 730 provides the command sequences to the non-volatile memory die 604 and receives status information from the non-volatile memory die 604. The memory interface 730 may include or correspond to the second interface 132 of FIG. 1. In some implementations, the memory interface 730 may be a double data rate (DDR) interface, such as a Toggle Mode interface. A flash control layer 732 controls the overall operation of back end module 710.

Additional components of the non-volatile memory system 600 illustrated in FIG. 7A include a power management module 712 and a media management layer 738, which performs wear leveling of memory cells of the non-volatile memory die 604. The non-volatile memory system 600 also includes other discrete components 740, such as external electrical interfaces, external RAM, resistors, capacitors, or other components that may interface with the controller 602. In some implementations, one or more of the physical layer interface (PHY) 722, the RAID module 728, the media management layer 738, and/or the buffer management/bus controller 714 are optional components that may be omitted from the controller 602.

Figure 7B:
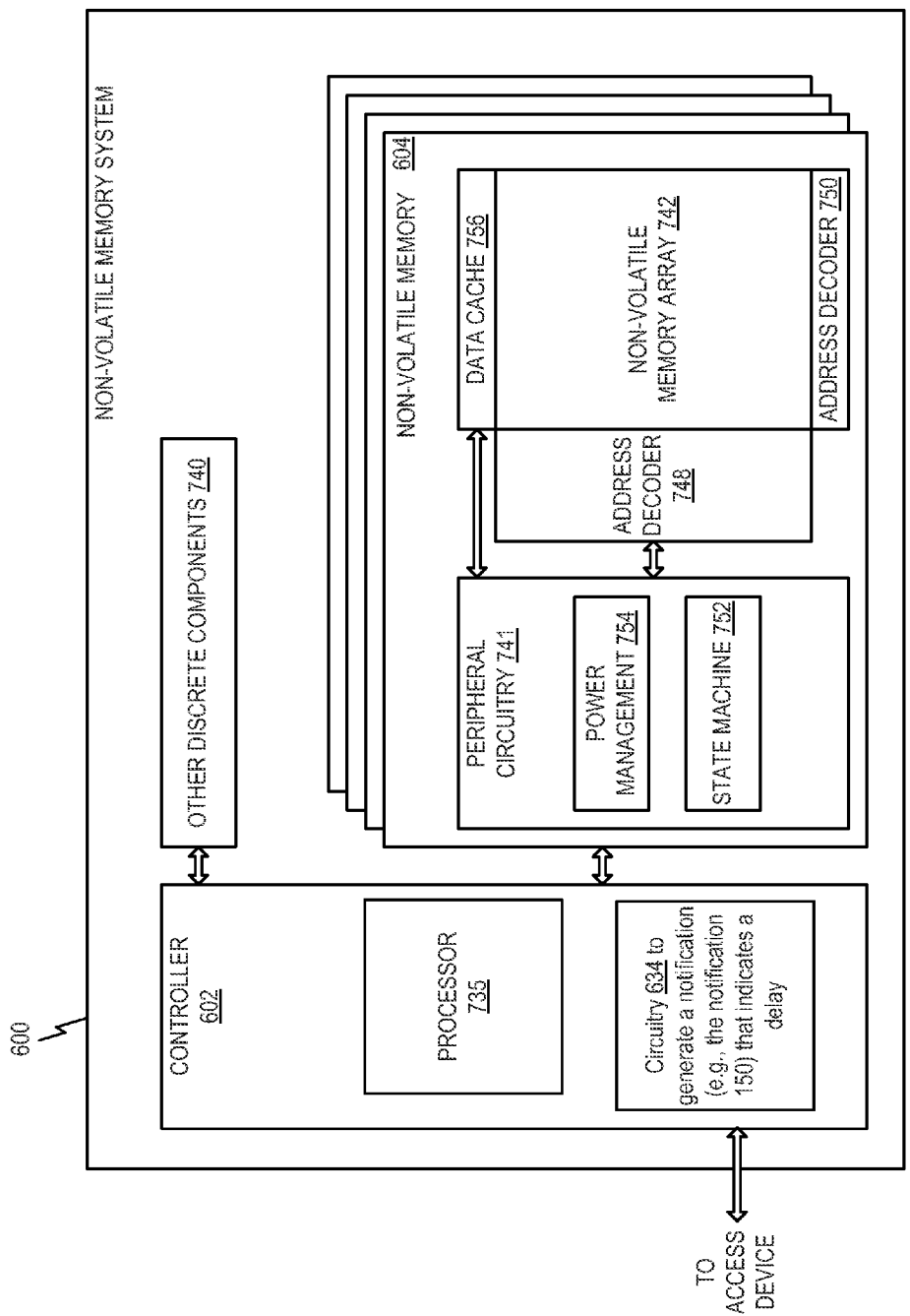
FIG. 7B is a block diagram of a second illustrative example of components included in the non-volatile memory system of FIG. 6A.

FIG. 7B is a block diagram illustrating exemplary components of the non-volatile memory die 604 in more detail. The non-volatile memory die 604 includes peripheral circuitry 741 and a non-volatile memory array 742. The non-volatile memory array 742 includes non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry 741 includes a state machine 752 that provides status information to the controller 602. The controller 602 may also include the circuitry 634. The non-volatile memory die 604 further includes discrete components 740, an address decoder 748, an address decoder 750, and a data cache 756 that caches data.

In some implementations, the controller 602 may optionally include a processor 735. In an illustrative example, a processor (e.g., the processor 735), such as a processor of the non-volatile memory system 600, may be programmed to receive data from a word line of a block of the non-volatile memory array 742 and to determine an error indicator value based on the data. The processor may further execute instructions to, in response to the error indicator value satisfying a threshold, indicate that at least a portion of the word line is to be skipped during writing of second data to the block of the non-volatile memory array 742.

The method 400 of FIG. 4 and/or the method 500 of FIG. 5 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 400 of FIG. 4 and/or the method 500 of FIG. 5 can be initiated or controlled by one or more processors, such as one or more processors included in or coupled to a controller or a memory of the storage device 102, the access device 170 (e.g., the processor 174) of FIG. 1, the access controller 210 of FIG. 2, the access controller 310 of FIG. 3, the non-volatile memory system 600 of FIG. 6A, and/or the controller 602 of FIG. 6B. A controller configured to perform the method 400 of FIG. 4 and/or the method 500 of FIG. 5 may be able to detect errors during read operations and to skipping word line portions during write operations. As an example, one or more of the methods of FIGS. 4-5, individually or in combination, may be performed by the controller 130 of FIG. 1. To illustrate, a portion of one of the methods FIGS. 4-5 may be combined with a second portion of one of the methods of FIGS. 4-5. Additionally, one or more operations described with reference to the FIGS. 4-5 may be optional, may be performed at least partially concurrently, and/or may be performed in a different order than shown or described.

Although various components of the storage device 102, such as the controller 130, the access device 170 (e.g., the processor 174) of FIG. 1, the access controller 210 of FIG. 2, the access controller 310 of FIG. 3, the non-volatile memory system 600 of FIG. 6A, the storage module 640 of FIG. 6B, and/or the hierarchical storage system 650 of FIG. 6C are depicted herein as block components and described in general terms, such components may include one or more physical components, such as hardware controllers, one or more microprocessors, state machines, logic circuits, one or more other structures, other circuits, or a combination thereof configured to enable the various components to perform operations described herein.

Components described herein may be operationally coupled to one another using one or more nodes, one or more buses (e.g., data buses and/or control buses), one or more other structures, or a combination thereof. One or more aspects of the various components may be implemented using a microprocessor or microcontroller programmed to perform operations described herein, such as one or more operations of the method the method 400 of FIG. 4 and/or the method 500 of FIG. 5.

Alternatively or in addition, one or more aspects of the storage device 102, such as the controller 130, the access device 170 (e.g., the processor) of FIG. 1, the access controller 210, the storage devices 212-216 of FIG. 2, the access controller 310, the storage devices 312-318 of FIG. 3, the non-volatile memory system 600 of FIG. 6A, the storage module 640 of FIG. 6B, and/or the hierarchical storage system 650 of FIG. 6C may be implemented using a microprocessor or microcontroller programmed (e.g., by executing instructions) to perform operations described herein, such as one or more operations of the method 400 of FIG. 4 and/or one or more operations of the method 500 of FIG. 5, as described further herein. As an illustrative, non-limiting example, the storage device 102 includes a processor executing instructions (e.g., firmware) retrieved from the memory 104. Alternatively or in addition, instructions that are executed by the processor may be retrieved from a separate memory location that is not part of the memory 104, such as at a read-only memory (ROM).

In some implementations, each of the controller 130, the memory device 103, the access device 170 (e.g., the processor 174) of FIG. 1, the access controller 210 of FIG. 2, and/or the access controller 310 of FIG. 3 may include a processor executing instructions that are stored at a memory, such as a non-volatile memory of the storage device 102, the access device 170 of FIG. 1, the access controller 210 of FIG. 2, or the access controller 310 of FIG. 3. Alternatively or additionally, executable instructions that are executed by the processor may be stored at a separate memory location that is not part of the non-volatile memory, such as at a read-only memory (ROM) of the storage device 102, the access device 170 of FIG. 1, the access controller 210 of FIG. 2, or the access controller 310 of FIG. 3.

The second memory 140, the memory device 103 (e.g., the memory 104), the memory 176, and/or the non-volatile memory die 604 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, a phase change memory (PCM) or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the second memory 140, the memory device 103 (e.g., the memory 104), the memory 176 of FIG. 1, and/or the non-volatile memory die 604 may include another type of memory. The second memory 140, the memory device 103 (e.g., the memory 104), the memory 176 of FIG. 1 and/or the non-volatile memory die 604 of FIG. 6A may include a semiconductor memory device.

Semiconductor memory devices include volatile memory devices, such as dynamic random access memory ("DRAM") or static random access memory ("SRAM") devices, non-volatile memory devices, such as magneto resistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the examples described herein are intended to provide a general understanding of the various aspects of the disclosure. Other implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   a non-volatile memory configured to store data; and
   a controller coupled to the non-volatile memory, the controller configured to:
   receive a read command from an access device, the read command comprising:
   a first request for the data; and
   a second request for a notification indicating a duration of a delay related to execution of a read operation responsive to the read command;
   detect a pending operation of the non-volatile memory, the pending operation delaying execution of the read operation responsive to the read command; and send the notification to the access device prior to completion of the pending operation, the notification indicating that the duration of the delay related to execution of the read operation is greater than or equal to a threshold.

2. The device of claim 1, wherein:
the controller is further configured to determine an estimated amount of time until completion of the pending operation, and
the duration of the delay is determined based on the estimated amount of time.

3. The device of claim 1, wherein the controller is further configured to determine whether the read command comprises a flag that indicates to abort the read command if the duration of the delay is greater than or equal to the threshold.

4. The device of claim 1, wherein the controller includes a timer and a comparator, the timer configured to indicate an amount of time to complete execution of the pending operation, the comparator configured to compare a value of the timer to a threshold.

5. The device of claim 1, wherein:
the controller includes a scheduler that is configured to schedule execution of the read operation, and
the controller is further configured to initiate execution of the read operation and to receive data from the non-volatile memory responsive to execution of the read operation.

6. The device of claim 1, wherein, in response to the duration of the delay being greater than or equal to the threshold, the controller is further configured to initiate processing of the read command without scheduling the read operation.

7. The device of claim 1, further comprising a timer configured to indicate a timeout associated with the read operation, wherein the controller is further configured to send a timeout indication to the access device in response to the timeout.

8. The device of claim 1, wherein the notification further indicates:
whether the read operation is scheduled for execution, and
the threshold.

9. The device of claim 1, wherein, responsive to sending the notification, the controller is further configured to receive a second read command from the access device to access redundant data and to perform a second read operation responsive to the second read command.

10. The device of claim 9, wherein the redundant data is sent to the access device prior to completion of the pending operation.

11. A device comprising:
means for storing data; and
means for:
receiving a read command from an access device, the read command including a request for a notification of a delay duration related to a time of starting execution of a read operation responsive to the read command;
detecting a pending operation of the means for storing data, execution of the pending operation delaying execution of the read operation responsive to the read command; and
sending the notification to the access device prior to completion of the pending operation.

12. The device of claim 11, wherein:
the pending operation is detected in response to the read command being received, and
the pending operation is being executed at the time of receiving the read command.

13. The device of claim 11, wherein:
the pending operation is detected in response to the read command being received, and
the pending operation is scheduled for execution at the time of receiving the read command.

14. The device of claim 11, wherein the pending operation includes multiple operations.

15. The device of claim 11, wherein the pending operation comprises a write operation, an erase operation, a data recovery operation, a data move operation, a data refresh operation, or a background operation.

16. The device of claim 11, wherein the means for receiving, detecting, and sending is configured to determine the delay duration and to compare the delay duration to a threshold.

17. The device of claim 11, further comprising means for indicating a remaining time of execution of the pending operation.

18. The device of claim 11, further comprising means for scheduling execution of the read operation in response to receiving the read command.

19. The device of claim 18, wherein the means for receiving, detecting, and sending is configured to:
receive, from the access device, a cancel command associated with the read command, and
cancel a scheduled execution of the read operation responsive to the cancel command.

20. A device comprising:
an interface configured to communicate with a storage device; and
a processor coupled to the interface, the processor configured to:
send a read command to the storage device, the read command comprising:
a first request for data stored at the storage device; and
a second request for a notification indicating a duration of a delay related to a time of starting execution of a read operation corresponding to the read command;
responsive to the read command, receive the notification from the storage device; and
in response to the notification, send a second read command to request redundant data associated with the data.

21. The device of claim 20, wherein the processor is further configured to receive the redundant data via the interface.

22. The device of claim 20, wherein:
the storage device comprises a solid-state drive, and
the interface is further configured to be coupled to multiple data storage devices that have a redundant array of independent disks (RAID) configuration.

23. The device of claim 22, wherein the RAID configuration comprises a RAID 1 configuration, a RAID 5 configuration, a RAID 6 configuration, a RAID 10 configuration, a RAID 15 configuration, a RAID 16 configuration, a RAID 51 configuration, or another RAID configuration.

24. The device of claim 20, further comprising a memory configured to store a data tracking table that indicates a first storage location of the data and indicates a second storage location of the redundant data.

25. The device of claim 20, wherein the processor is further configured to generate the read command, the read command further comprising data that indicates whether the read operation is to be executed regardless of the delay.

26. A method comprising:
in an access device that is coupled to a storage device, performing:
sending a read command to the storage device, the read command comprising:
a first request for data stored at the storage device; and
a second request for a notification indicating a duration of a delay related to a time of starting execution of a read operation corresponding to the read command;
responsive to the read command, receiving the notification from the storage device; and
in response to the notification, sending a second read command to request redundant data associated with the data.

27. The method of claim 26, further comprising, after sending the second read command, receiving an indication of expiration of a timeout period corresponding to the read command from the storage device.

28. The method of claim 26, further comprising, in response to receiving the notification:
identifying a second storage device that includes the redundant data, wherein:
the redundant data comprises at least a portion of a copy of the data, and
the second read command is sent to the second storage device; and
receiving at least the portion of the copy from the second storage device.

29. The method of claim 26, further comprising, in response to receiving the notification:
identifying a second storage device that includes a portion of the redundant data associated with the data, the redundant data further comprising parity data of the data;
receiving the portion of the redundant data from the second storage device; and
recovering the data at the access device based at least in part on the portion of the redundant data.

30. The method of claim 29, further comprising, in response to receiving the notification:
identifying a third storage device that includes a second portion of the redundant data;
sending a third read command to the third storage device to request the second portion stored at the third storage device; and
receiving the second portion of the redundant data from the third storage device, wherein the data is generated by the access device based in part on the second portion of the redundant data.

31. The method of claim 26, further comprising, after receipt of the notification, resending the read command to the storage device or sending a cancel command to the storage device to cancel execution of a read operation that is responsive to the read command.

32. The method of claim 26, further comprising determining, based on the notification, that the duration of the delay exceeds a threshold, wherein the second read command to request the redundant data is sent in response to determining that the duration of the delay exceeds the threshold.

* * * * *